United States Patent [19]

Smith et al.

[11] Patent Number: 5,678,013
[45] Date of Patent: *Oct. 14, 1997

[54] MULTI-TYPE SUBROUTINES FOR GRAPHICAL REWRITE RULES

[75] Inventors: David C. Smith, Saratoga; G. Allen Cypher, Palo Alto, both of Calif.

[73] Assignee: Apple Computer, Inc., Cupertino, Calif.

[*] Notice: The term of this patent shall not extend beyond the expiration date of Pat. No. 5,566,295.

[21] Appl. No.: 377,914

[22] Filed: Jan. 25, 1995

[51] Int. Cl.⁶ .................................................. G06F 3/00
[52] U.S. Cl. ................................ 395/333; 395/326
[58] Field of Search .......................... 395/161, 160, 395/155, 335, 339, 330, 329, 333, 326

[56] References Cited

U.S. PATENT DOCUMENTS

| | | | |
|---|---|---|---|
| 5,361,336 | 11/1994 | Atchison | 395/275 |
| 5,388,198 | 2/1995 | Layman et al. | 395/334 |
| 5,388,203 | 2/1995 | Kaneko | 395/330 |
| 5,392,386 | 2/1995 | Chalas | 395/330 |
| 5,404,440 | 4/1995 | Asahi | 395/375 |
| 5,481,665 | 1/1996 | Okada et al. | 395/329 |
| 5,491,783 | 2/1996 | Douglas et al. | 395/345 |
| 5,555,365 | 9/1996 | Selby et al. | 395/345 |
| 5,566,295 | 10/1996 | Cypher et al. | 395/345 |

OTHER PUBLICATIONS

Smith, David Canfield, Allen Cypher and Jim Spohrer; "Kidsim: Programming Agents Without a Programming Language." Communications of the ACM, Jul. 1994, vol. 37, No. 7, pp. 55–67.

*Primary Examiner*—Kee M. Tung
*Assistant Examiner*—Steven P. Sax
*Attorney, Agent, or Firm*—Blakely, Sokoloff, Taylor & Zafman

[57] ABSTRACT

A method and apparatus for constructing subroutines to define the behavior of simulation objects is provided. The apparatus includes a display, a processor, and an input device. The processor generates on the display a GRR set region associated with a simulation object. A user operates the input device to place visual representations of rules and/or subroutines within the GRR set region. When a visual representation of a rule or subroutine is placed within a GRR set, computer step sequences that implement the behavior specified for the rule or subroutine are generated for the simulation object. A user may operate the input device to activate a control on a visual subroutine indicator to cause a subroutine region to appear. When a visual representation of a rule or subroutine is placed within a subroutine region, the behavior specified for the rule or subroutine is incorporated into the subroutine associated with the subroutine region. Different types of subroutines are provided, where the type of a subroutine determines how the rules within the subroutine are processed during a simulation. Pretests may be specified for subroutines so that the behavior represented by the rules within the subroutine will not be exhibited unless the current state of the simulation satisfies the conditions of the pretest. During the performance of a simulation, the processor displays images associated with simulation objects on the display. The processor causes the images to behave according to the generalized computer step sequences that have been generated based upon the rules and/or subroutines represented in the GRR set regions for the respective objects.

24 Claims, 26 Drawing Sheets

MULTI-TYPE SUBROUTINES FOR GRAPHICAL REWRITE RULES

FIELD OF THE INVENTION

The present invention relates to visual programming, and more specifically, to a method and apparatus for visually constructing subroutines for use in a simulation system.

BACKGROUND OF THE INVENTION

Computer simulations are a powerful educational tool. In a computer simulation, groups of objects having predefined properties or characteristics typically interact according to corresponding object behavior rules that have been programmed by the creators of the simulation. Interactions between objects generate one or more corresponding predefined results or consequences according to the hard-programmed behavior rules. A user can selectively place objects in a simulation and observe their resulting interactions on a display. The results generated by a given interaction can initiate further interactions between objects, resulting in a chain of events. Computer simulations thus allow complex situations to be created and modeled.

An example of a popular computer simulation is SimCity, in which a user is responsible for the construction, maintenance, and expansion of a computer-generated city. Objects used in SimCity include roads, railroads, police stations, hospitals, and various types of buildings. Object interactions produce results such as growth, revenue, crime, traffic congestion, and pollution.

Most computer simulations do not allow the predefined object characteristics and behavior rules to be modified. As a result, the simulation is predictable and inflexible, thereby limiting its capabilities as an education tool. For example, currently in SimCity the addition of a railroad at a given location results in the elimination of pollution problems in the vicinity of the railroad. While the addition of a railroad might aid in the reduction of pollution problems, particularly if it were used for public transportation purposes, the complete elimination of pollution problems in this example is an unrealistic scenario.

Computer simulation designers have realized that simulations are much more useful and versatile if the user is allowed to modify object properties and behavior rules. Modification of object properties and behavior rules to any significant degree, however, involves computer programming. The typical computer simulation user does not possess the specialized skills and knowledge required for computer programming. In particular, knowledge of computer program constructs and syntax are learning barriers that are difficult for children and non-technical people to overcome. Therefore, computer simulation designers have attempted to provide simulation users with a simplified means for programming the simulation.

Simplified "English-like" programming languages are one approach to take to simplify simulation programming for users. One example of this approach is the HyperTalk programming language. While such a programming language that resembles a user's native language can be easier for the user to learn, writing programs is still an abstract process. There is a conceptual gulf between what the user wants to happen in the simulation, and what he or she has to write even in these "English-like" programming languages. For example, to move an object on the simulation display, in HyperTalk the user must deal with x and y coordinates. As a result, this approach towards simplifying simulation programming has been unsuccessful.

Another approach taken to simplify simulation programming for simulation users is programming by demonstration. In programming by demonstration, a user directly manipulates objects to indicate a sequence of actions to be performed. A sequence of computer program steps that will perform each required action in this sequence is then automatically generated. While this simplifies the creation of the computer program steps for the user, a listing of such computer program steps requires specialized knowledge to understand. Because the typical simulation user does not posses such knowledge, the simulation user does not understand the relationships between demonstrated object actions, and their corresponding computer program steps. Prior art programming by demonstration systems and methods are therefore ineffective for teaching the typical simulation user about computer programming concepts.

A common construct encountered in computer programming is the conditional statement. A conditional statement specifies that if a predetermined condition holds true, then a corresponding sequence of computer program steps are to be executed. One form of the conditional statement is a Before-After rule. A Before-After rule deals with simulation states. Each Before-After rule has two parts: a "before" part and an "after" part. Each part represents a possible state of the simulation. Whenever the "before" part matches the current state of the simulation, the simulation is transformed into the state specified by the "after" part. Before-After rules are widely used in the branch of Artificial Intelligence known as "expert systems." A graphical Before-After rule is referred to herein as a Graphical Rewrite Rule (GRR). When a graphical condition or picture matches the "before" portion of the GRR, a sequence of computer program steps is executed that produces the graphical condition indicated by the "after" portion of the GRR.

For each simulation object, the simulation user creates a GRR for each possible simulation state of interest. Even in relatively simple simulations, each simulation object can participate in a large number of distinct simulation states. Therefore, an undesirably large number of GRR definitions must be made for each object. This drawback has limited the use of Graphical Rewrite Rules as a means for simplifying simulation programming.

In the definition of a GRR, the user graphically specifies the corresponding "before" and "after" portions of the GRR. The sequence of computer program steps that results in the graphical transformation of the "before" portion into the "after" portion is generated automatically, thereby greatly simplifying simulation programming for the user. Some systems and methods have tried to have the computer infer how to arrive at the after state from the before state. However, this is currently an unsolved problem in computer science, and such systems and methods have not succeeded.

During the execution of a simulation, one or more characteristics or properties of an object may change according to one or more applicable rules. The set of properties corresponding to an object represents its internal state. An objects internal state can influence the object's behavior. For example, an object representing a living creature may have a property corresponding to hunger. If the creature's hunger exceeds a certain level, the creature may subsequently search for food rather than initiate another behavior. In general, changes to an object's internal state in prior art simulation systems and methods occur without the user's knowledge. That is, they occur invisibly during the execution of a simulation. In addition, the simulation user cannot define or modify an object's internal state after simulation execution has begun. When the user's knowledge of and access to each object's internal state is limited, the simulation again becomes less effective as an education tool.

Therefore, there is a need for a means of providing simulation users with flexible control over simulation information and simulation behavior without requiring specialized programming knowledge.

SUMMARY OF THE INVENTION

A method and apparatus for constructing subroutines to define the behavior of simulation objects are provided. The apparatus includes a display, a processor, and an input device. The processor generates on the display a GRR set region associated with a simulation object. The GRR set region of a simulation object is a portion of the screen that holds visual representations of the rules and/or subroutines that define the behavior of the simulation object.

A user operates the input device to place visual representations of rules and/or subroutines within the GRR set region. When a visual representation of a rule or subroutine is placed within a GRR set, computer step sequences that implement the behavior specified for the rule or subroutine are generated for the simulation object.

A user may operate the input device to activate a control on a visual subroutine indicator to cause a subroutine region to appear. A subroutine region of a subroutine is a portion of the screen that holds visual representations of the rules and/or subroutines that are part of the subroutine. When a visual representation of a rule or subroutine is placed within a subroutine region, the behavior specified for the rule or subroutine is incorporated into the subroutine associated with the subroutine region.

Different types of subroutines are provided, where the type of a subroutine determines how the rules within the subroutine are processed during a simulation. Pretests may be specified for subroutines so that the behavior represented by the rules within the subroutine will not be exhibited unless the current state of the simulation satisfies the conditions of the pretest.

During the performance of a simulation, the processor displays images associated with simulation objects on the display. The processor causes the images to behave according to the generalized computer step sequences that have been generated based upon the rules and/or subroutines represented in the GRR set regions for the respective objects.

According to one aspect of the invention, a method for establishing behavior for an object implemented in a computer system is provided. According to the method, a GRR set region associated with the object is displayed on a visual display. The processor receives input that designates one or more subroutines for the object. The preferred method of designating a subroutine is selecting a "new subroutine" control icon, or dragging a subroutine indicator into the GRR set region from another location on the display.

A subroutine is defined by establishing an ordered list of rules for the subroutine. An ordered list of rules is established by performing a series of steps. In the series of steps, a visual subroutine indicator is displayed within the GRR set region. The processor receives input that designates one or more behavior rules for the subroutine. Behavior rules are rules about how the object functions. In the preferred embodiment, the behavior rules are graphical rewrite rules.

Typically, the input for designating rules is generated when a user (1) creates a new visual rule indicator within a subroutine region associated with the subroutine, or (2) moves a visual rule indicator to the subroutine region associated with the subroutine. The behavior rules that are represented by the visual rule indicators are thereby incorporated into the given subroutine. Finally, the processor generates a corresponding generalized computer program step sequence for the subroutine based upon the behavior rules represented in its subroutine display region.

A user may select a subroutine and cause the processor to display the subroutine region corresponding to the selected subroutine. Within a displayed subroutine display region, the processor displays a visual rule representation for each of the behavior rules associated with the selected subroutine.

According to one aspect of the invention, each visual subroutine indicator includes a control for opening and closing the subroutine. When the subroutine is closed, the representation of the subroutine includes only the subroutine visual indicator. When the subroutine is open, the representation of the subroutine also includes the subroutine display region in which is displayed visual rule indicators for all of the rules that belong to the subroutine.

The process of generating a generalized computer program step sequence for a subroutine includes generating a set of generalized computer program steps for each behavior rule in the given subroutine and generating generalized computer program steps that dictate when to execute the behavior rule program steps.

According to an aspect of the invention, various types of subroutines are provided. The visual subroutine indicator includes an indication of the type of the subroutine. In the preferred embodiment, "normal", "do-all", "random" and "story" subroutine types are supported. The generalized computer program steps that dictate when to execute the behavior rule program steps are different for each type of subroutine.

For normal subroutines, each behavior rule is sequentially tested to determine if preconditions for the behavior rule are satisfied. The sequential testing is performed until either all of the behavior rules for the subroutine have been tested or the preconditions for a behavior rule are satisfied. If preconditions for a particular behavior rule are satisfied, then the set of generalized computer program steps for the particular behavior rule are executed. Random subroutines work the same as normal subroutines except that the order of the behavior rules within a random subroutine is scrambled after the execution of the subroutine.

For do-all subroutines, each behavior rule is tested to determine if preconditions for the behavior rule are satisfied. The set of generalized computer program steps for the each given behavior rule is executed if preconditions for the given behavior rule are satisfied.

For story subroutines, a first behavior rule is selected as a current behavior rule. During a simulation clock period, the current behavior rule is tested to determine if preconditions for the current behavior rule are satisfied. If preconditions for the particular behavior rule are satisfied, then the set of generalized computer program steps for the particular behavior rule are executed, and the next rule in the subroutine is established as the current rule.

According to another aspect of the invention, an apparatus for establishing behavior for a simulation object is provided. The apparatus includes a display device, an input device, a memory and a processor. The memory stores the simulation object and a sequence of instructions.

The processor is coupled to the display device, the input device and the memory. The processor is configured to retrieve and execute the sequence of instructions from the memory. Execution of the sequence of instructions causes the processor to perform a series of operations. The operations include operations which implement the method describe above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
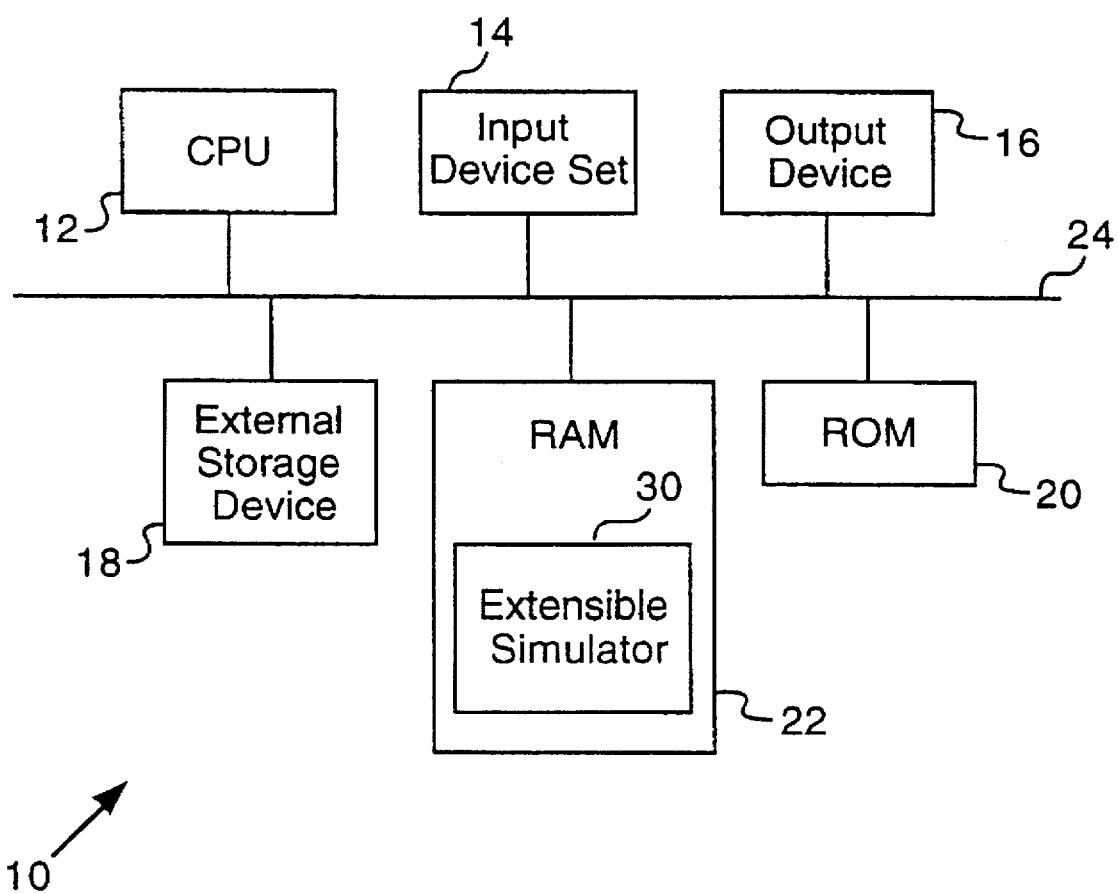
FIG. 1 is a block diagram of a preferred embodiment of an extensible simulation system constructed in accordance with the present invention.

Referring now to FIG. 1, a preferred embodiment of an extensible simulation system 10 constructed in accordance with the present invention is shown. The system 10 preferably comprises a Central Processing Unit (CPU) 12, an input device 14, an output device 16, an external storage device 18, and predetermined amounts of Read-Only Memory (ROM) 20 and Random Access Memory (RAM) 22. In the preferred embodiment of the system 10, an extensible simulator 30 resides in RAM 22. Each element of the system 10 has an input and an output coupled to a common system bus 24. In an exemplary embodiment, the system 10 of the present invention is an Apple Macintosh computer system having a Motorola MC68430 CPU, a keyboard and a mouse-type controller, a color graphics monitor, 8 Mb of RAM, a 20 Mb or larger hard disk drive, and the extensible simulator 30 of the present invention.

Figure 2:
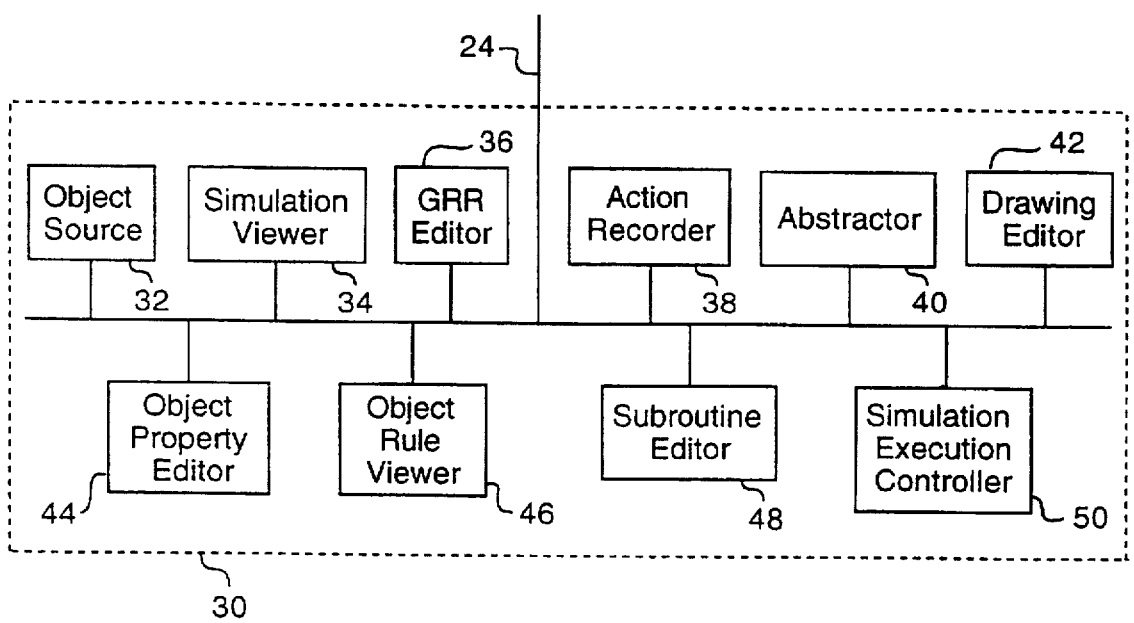
FIG. 2 is a block diagram of a preferred embodiment of an extensible simulator of the present invention.

Referring now to FIG. 2, a block diagram of a preferred embodiment of the extensible simulator 30 of the present invention is shown. The extensible simulator 30 preferably comprises an object source 32, a simulation viewer 34, a Graphical Rewrite Rule (GRR) editor 36, an action recorder 38, an abstractor 40, a drawing editor 42, an object property editor 44, an object rule viewer 46, a subroutine editor 48, and a simulation execution controller 50. These components of the extensible simulator 30 have an input and an output coupled to the common system bus 24. In the preferred embodiment, each element of the extensible simulator 30 is a computer program step sequence stored in RAM 22, which selectively controls the operation of the CPU 12.

In the present invention, a simulation is a group of objects exhibiting user-defined behaviors. In the simulation, each object occupies a position within a set of simulation grid elements. The extensible simulator 30 enables a simulation user to define and modify the possible behaviors the objects can exhibit during the simulation's execution. The extensible simulator 30 also allows the simulation user to define properties or characteristics associated with each object, to selectively modify property values, and to specify how one or more properties will influence the object's behavior.

In the preferred embodiment of the present invention, each possible behavior of a given object is determined by a corresponding user-defined GRR. Each GRR has a "before" portion and an "after" portion. The "before" portion graphically represents a state associated with the object that can occur during simulation execution. The "after" portion graphically represents the state the object is to transition to when the state indicated by the "before" portion occurs. In other words, the "after" portion shows what is to happen to the object following the "before" portion's occurrence during simulation execution.

PROGRAMMING BY DEMONSTRATION

The simulation user defines a GRR corresponding to a given object through programming by demonstration. During programming by demonstration, the user graphically indicates actions that are to be performed by or upon the given object or one or more associated objects. The user indicates each action with the input device 14 by dragging and dropping a selected object or by selecting a predetermined user interface element displayed on the output device 16. The actions indicate the manner in which the object is to transition between the states shown by the GRR's "before" and "after" portions. In the preferred embodiment, the performance of an action during simulation execution can affect an object in one of three possible ways, namely 1) by moving the object from one location to another in the simulation; 2) by changing one or more object properties; or 3) by altering the objects appearance. Those skilled in the art will recognize that in an alternate embodiment, an object could be affected in other ways. The extensible simulator 30 records and stores each action as a portion of a recording. Once a recording has been created, the extensible simulator 30 analyzes the recording and creates a corresponding generalized sequence of computer program steps. The set of computer program steps created for a given GRR are referred to herein as the GRR's program.

The combination of Graphical Rewrite Rules and programming by demonstration in the present invention enable the ordinary simulation user to program a simulation without requiring specialized knowledge of computer programming languages or concepts. Systems and methods in the prior art have been unsuccessful in providing ordinary simulation users with adequate programming capabilities because they lack this unique combination of Graphical Rewrite Rules and programming by demonstration.

THE USER INTERFACE

Figure 3A:
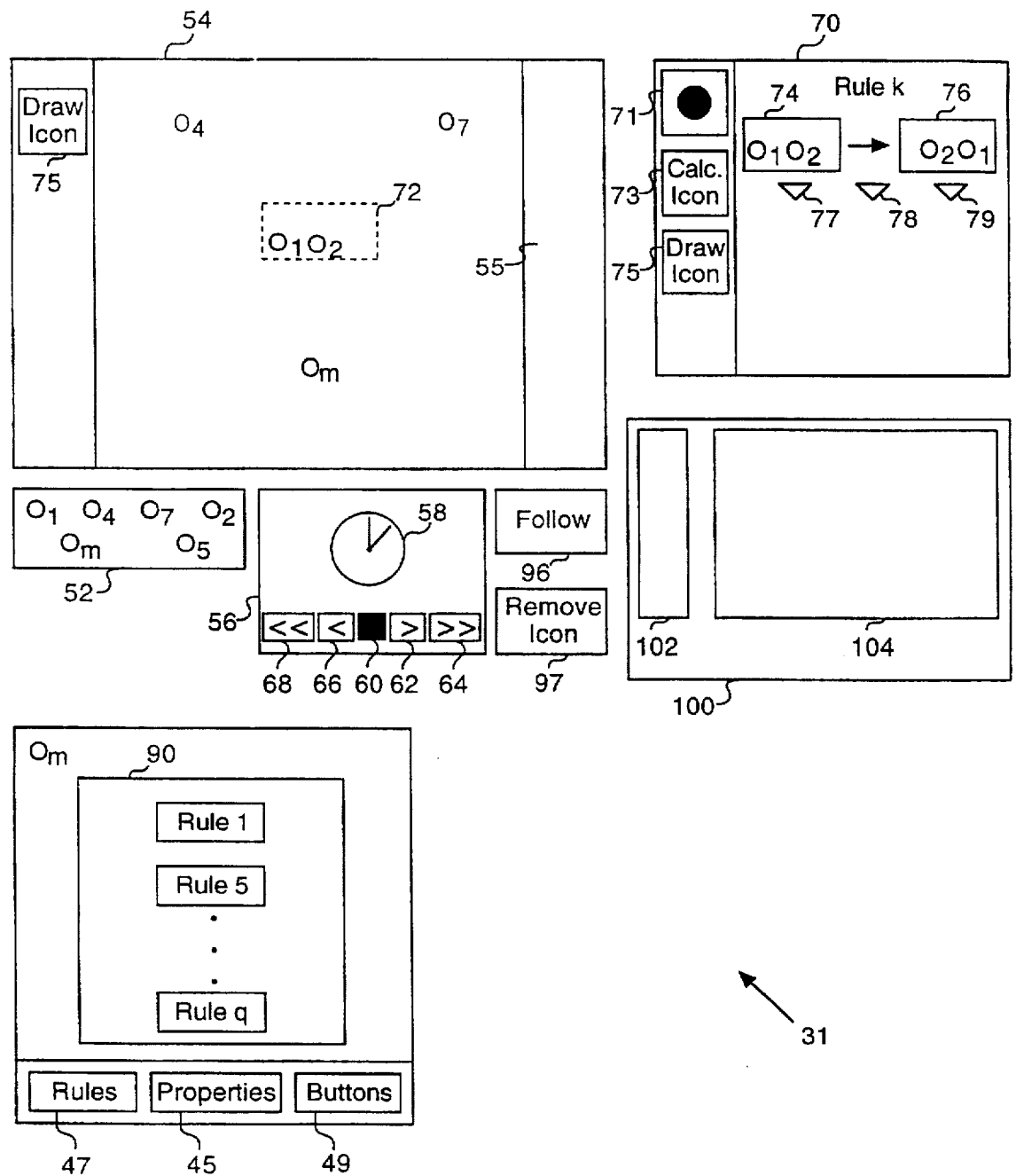
FIGS. 3A, 3B and 3C are block diagrams showing a preferred embodiment of a user interface of the present invention.
Figure 3B:
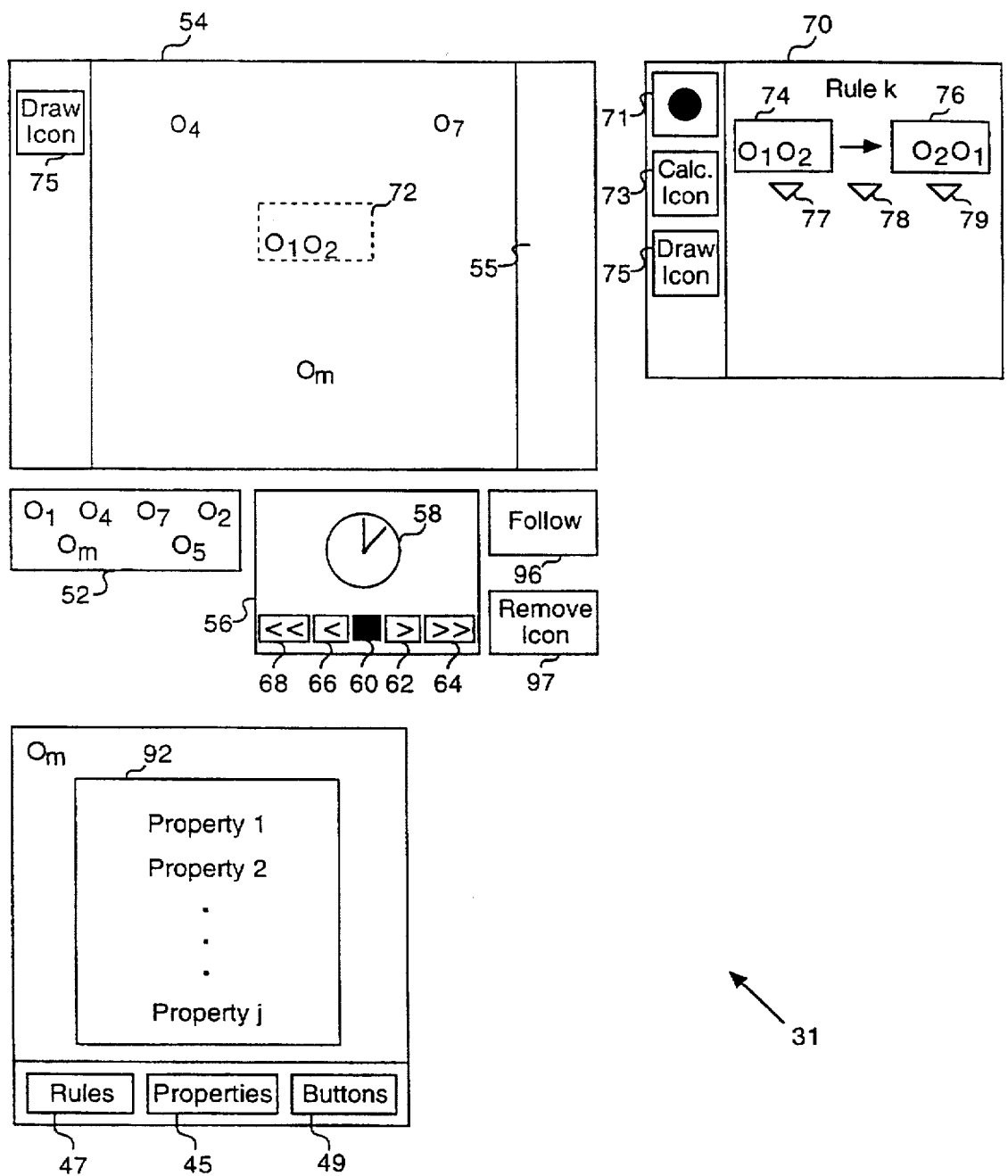
Figure 3C:
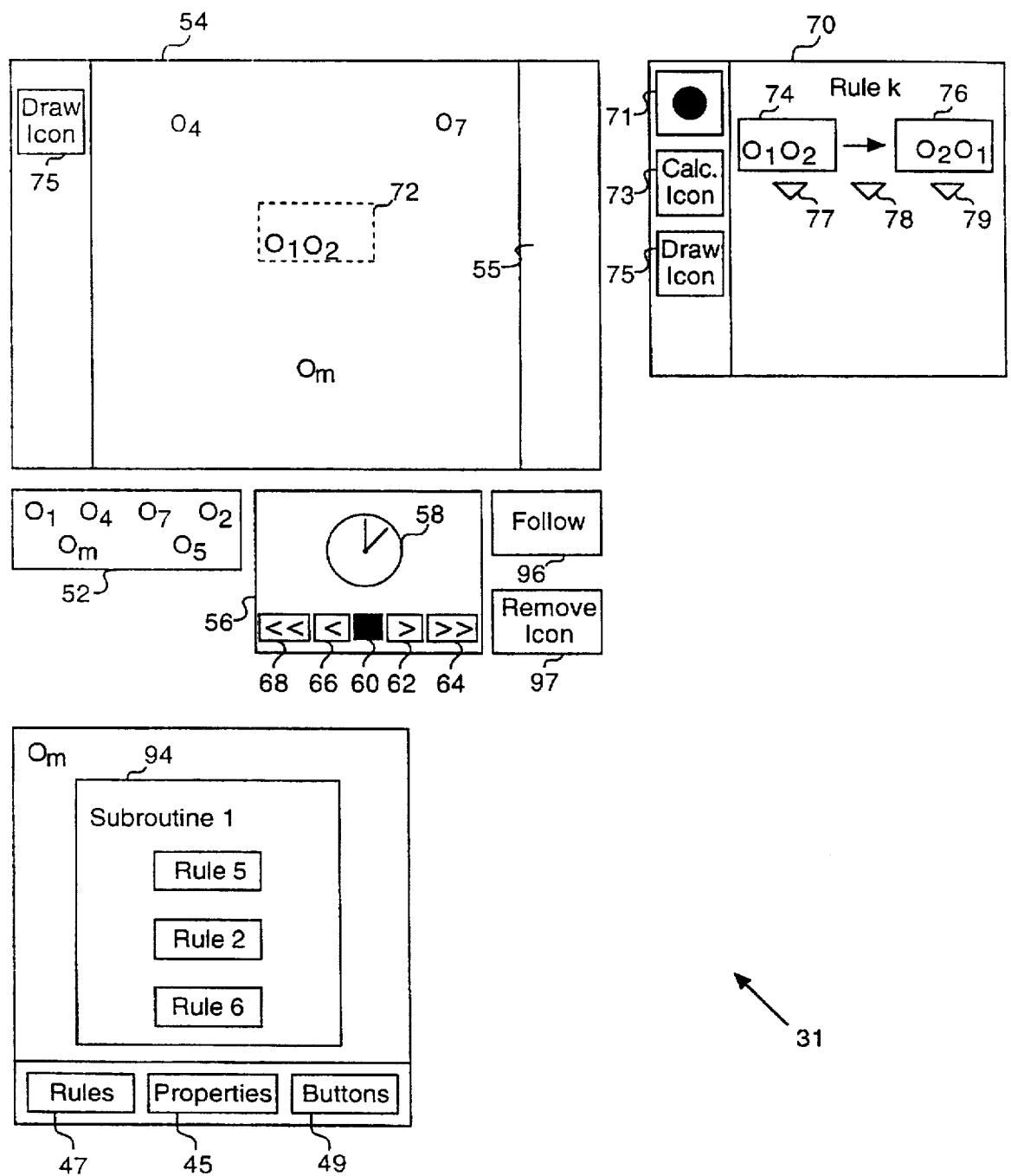

Referring to FIGS. 3A, 3B, and 3C, a set of block diagrams showing a preferred embodiment of the user interface 31 for the extensible simulator 30 of the present invention is shown. The user interface 31 preferably comprises an object source menu 52, a simulation viewer window 54, an execution control window 56, a GRR editor window 70, an object rule viewer window 90 (FIG. 3A), an object property editor window 92 (FIG. 3B), a subroutine editor window 94 (FIG. 3C), an object follower window 96, an object remove icon 97, and a drawing editor window 100. Those skilled in the art will recognize that additional or fewer graphical windows, menus, icons, affordances, or other user interface techniques could be present in an alternate embodiment of the user interface 31. The output device 16 typically possesses a limited area upon which information can be displayed. Therefore, in the preferred embodiment, predetermined regions on the output device 16 can be used to selectively display multiple graphical windows or menus. In addition, "pop-up" or temporary graphical windows are used to selectively display simulation information that the simulation user may require only occasionally. For example, the drawing editor window 100 is a temporary window that is displayed only when required by the user. The user is allowed to resize or selectively position elements of the user interface 31 on the output device 16. In FIGS. 3A, 3B, and 3C, the object rule viewer window 90, the object property editor window 92, and the subroutine editor window 94, respectively, are selectively displayed in the same region on the output device 16, thereby conserving display space while providing the simulation user with easy access to desired information.

THE OBJECT SOURCE

The object some 32 provides the user with simulation objects that can be selected for inclusion in the simulation. For each instance of an object, the object source 32 maintains a picture, an object type, an object name, a set of object properties, and a set of corresponding Graphical Rewrite Rules in RAM 22. The object source 32 creates and maintains a unique pointer to each instance of a given object present in a simulation. The object source 32 also generates and displays the object source menu 52. Within the object source menu 52, the object source 32 displays the picture of each object that is available to the simulation user. In the preferred embodiment, the user selects and places one or more instances of a given object into this simulation by moving or "dragging" the object's picture from within the object source menu 52 to a desired location in the simulation viewer window 54.

THE SIMULATION VIEWER

The simulation viewer 34 represents a simulation as the set of simulation grid elements and the location of each object contained therein. An object in the simulation occupies a predetermined number of simulation grid elements, and can move from one location to another within the set of simulation grid elements according to its corresponding Graphical Rewrite Rules during simulation execution. When the user adds an object to the simulation, the simulation viewer 34 records the object's location in an object location list stored in RAM 22. The simulation viewer 34 presents the simulation to the user as a scene displayed in the simulation viewer window 54. Each scene is a portion or a subset of all the simulation grid elements forming the simulation. In the preferred embodiment, each simulation grid element is preferably a grid square having predetermined graphical characteristics. During simulation execution, the simulation viewer 34 scans the object location list, and displays the picture of each object present in the displayed scene at its proper location. In the simulation viewer window 54 of FIGS. 3A, 3B, and 3C, exemplary objects $O_1$, $O_2$, $O_4$, $O_7$, and $O_m$ are present.

Within the simulation viewer window 54, the simulation viewer 34 also maintains a "time-out" region 55. The simulation viewer 34 allows the user to move or drag a selected object displayed in the simulation viewer window 54 into the timeout region 55 if the user desires to temporarily remove the selected object from the simulation. When the user moves an object into the time-out region 55, the simulation viewer 34 deletes the object's location from the object location list. While the object is in the time-out region 55, no actions are performed by or upon the object. In other words, the object's state is preserved while it is in the time-out region 55. The user can place the object back in the simulation when desired by moving the object from the time-out region 55 into the simulation viewer window 54. This in turn causes the simulation viewer 34 to insert the object's new location into the object location list, and resumes the object's participation in the simulation.

THE REMOVE ICON

The remove icon 97 enables the simulation user to delete an object from the simulation viewer window 54 or from the object source 32. In the preferred embodiment, the user deletes a selected object by dragging the selected object from the simulation viewer window 54 or the object source window 52 to the remove icon 97. The remove icon 97 also allows the user to delete a given GRR displayed in the object rule viewer window 90 in an analogous manner. The remove icon 97 functions in a manner similar to the trash icon in the Macintosh user interface produced by the Apple Computer, Inc., but provides a generalized delete capability. Additional items that can be deleted via the remove icon 97 include object properties find user-defined calculations.

THE DRAWING EDITOR

The drawing editor 42 provides the user with the ability to edit an object's picture, thereby changing the object's appearance. The drawing editor 42 also allows the user to create one or more animated transitions corresponding to object actions during GRR definition or editing. The user selectively causes the drawing editor 42 to display the drawing editor window 100 by selecting a drawing editor icon 75 displayed on the user interface 31. In the preferred embodiment, two instances of the drawing editor icon 75 are displayed. The drawing editor 42 signals the simulation viewer 34 to display a first instance of the drawing editor icon 75 in the simulation viewer window 54, and the drawing editor 42 signals the GRR editor 36 to display a second instance of the drawing editor icon 75 in the GRR editor window 70. Preferably, when the first drawing editor icon 75 instance is selected, the user can modify a selected object's picture. The second drawing editor icon 75 instance is preferably selected during GRR creation when the user desires to create an animated transition. In the preferred embodiment, the drawing editor 42 functions in a manner similar to conventional paint programs. The drawing editor 42 generates and displays an editing palette 102 that allows the user to select an editing tool such as a paintbrush or an eraser using the input device 14. The drawing editor 42 also generates a picture window 104, wherein the drawing editor 42 displays a selected object's picture as it is modified or as an animated transition is created.

THE PROPERTY EDITOR

A property is a name-value pair associated with an object. Each property includes a property name and a property value. The object property editor 44 allows the simulation user to define object properties as desired. For example, a property descriptor defined for an object representing an oak tree might be "height," with a corresponding property value of "5 meters." The object property editor 44 displays a selected object's properties via the object property editor window 92 as shown in FIG. 3B. In the preferred embodiment, the object property editor 44 is activated and its corresponding window is displayed when the user selects a properties button 45. The object property editor 44 enables the simulation user to utilize the input device 14 within the object property editor window 92 to define or modify properties corresponding to the selected object. In FIG. 3B, the object property editor window 92 indicates a set of object properties including Property 1, Property 2, and Property j for object $O_m$.

THE OBJECT RULE VIEWER

The object rule viewer 46 is activated when the user selects a rules button 47. The object rule viewer 46 generates and displays the object rule viewer window 90. When the object rule viewer 46 is active and the user selects an object, the object rule viewer 46 preferably displays in miniature form the "before" and "after" portions of each GRR associated with the selected object as shown in FIG. 3A. Multiple object rule viewer windows 90 can be in use simultaneously. The user can copy rules displayed in a rule viewer window 90 associated with a given object into a rule viewer window 90 associated with another object, thereby copying rules from the given object's GRR set into the other object's GRR set. In FIG. 3A, the object rule viewer window 90 shows that the Graphical Rewrite Rules for object $O_m$ include Rule 1, Rule 5, and Rule q as shown in FIG. 3A.

The simulation user can combine rules through the use of subroutines. The subroutine editor 48 allows the user to define a subroutine for an object by selecting and ordering one or more rules in the object's GRR set. According to one embodiment, the user activates the subroutine editor 48 by selecting a subroutine button (not shown) from within the object rule viewer window 90. The user interacts with the subroutine editor 48 by using the input device 14 within the subroutine editor window 94 as shown in FIG. 3C. Each subroutine defined for an object is itself listed in the object's GRR set. In FIG. 3C, the subroutine editor window 94 shows that Subroutine 1 for object $O_m$ contains Rule 5, Rule 2, and Rule 6. Subroutines will be described in greater detail below.

THE GRR EDITOR

The GRR editor 36 enables the user to create and modify Graphical Rewrite Rules through programming by demonstration. When a GRR is created, the GRR editor 36 stores its "before" and "after" portions in RAM 22. Information exchange between the user and the GRR editor 36 occurs via the GRR editor window 70. Within the GRR editor window 70, the GRR editor 36 generates and displays a "before" portion window 74, an "after" portion window 76, a completion button 71, a calculator icon 73, the second drawing editor icon 75, a property condition button a view program button 78, and a property modification button 79. In addition, the GRR editor 36 signals the simulation viewer 34 to maintain a simulation context indicator 72 in the simulation viewer window 54 during GRR creation or editing.

Each GRR corresponds to a selected object. For each GRR, the user defines a simulation context by positioning the simulation context indicator 72 in the simulation viewer window 54. During GRR creation or editing, the simulation viewer 34 preferably delineates each simulation grid element in the scene displayed in the simulation viewer window 54. In the preferred embodiment, the simulation viewer displays the simulation context indicator 72 as an outlined box surrounding one or more simulation grid elements. The simulation context interrelates the selected object, a subset of simulation grid elements containing the selected object, and any other objects contained therein according to their relative positions, simulation grid element occupancy, a set of hierarchical object classifications, and a set of property conditions. The simulation context is a simulation state that can occur during the simulation's execution. The initially defined simulation context defines the "before" portion of the GRR. In FIGS. 3A, 3B, and 3C, the simulation context indicator 72 contains objects $O_1$ and $O_2$. The "before" portion window 74 displays the "before" portion of the GRR to the user. Similarly, the "after" portion window 76 displays the GRR's "after" portion. In the definition of a new GRR, the "after" portion is initially identical to its "before" portion. In the preferred embodiment, the completion button 71 allows the user to indicate when GRR definition or editing has been completed.

Referring also now to FIGS. 4A, 4B, 4C, 4D, and 4E, a sequence of block diagrams presenting portions of the user interface 31 during an exemplary GRR definition for object $O_1$ and a corresponding symbolic GRR program created through programming by demonstration is shown. In the exemplary GRR definition, object $O_2$ is adjacent to object $O_1$ as shown.

Figure 4A:
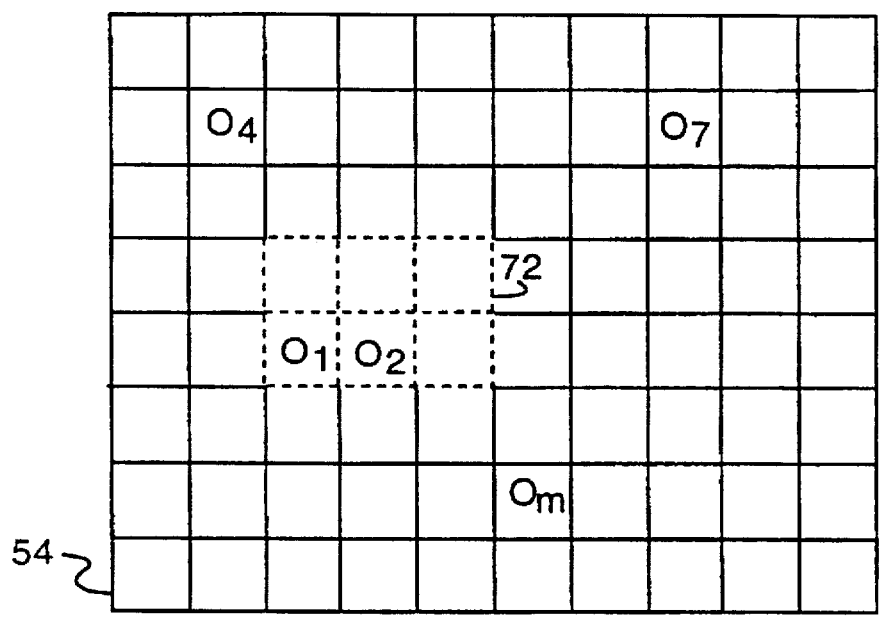
FIGS. 4A, 4B, 4C, 4D, and 4E are a sequence of block diagrams showing a portion of the user interface during an exemplary graphical rewrite rule definition through programming by demonstration.
Figure 4B:
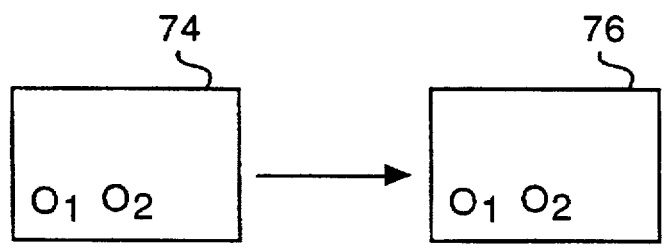
Figure 4C:
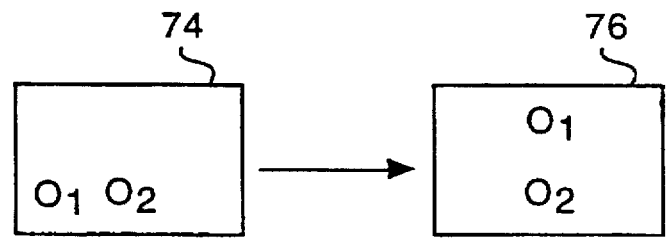
Figure 4D:
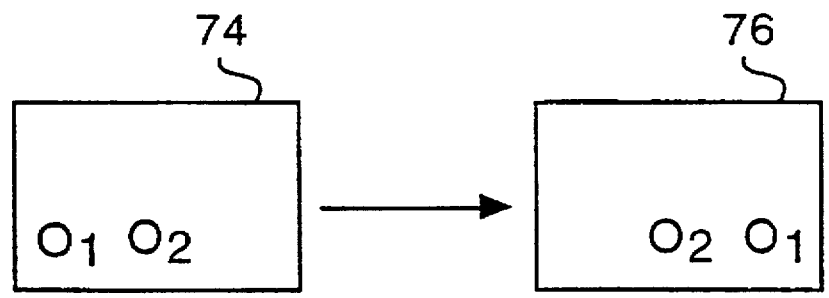

In the creation of a new GRR, the user first identifies an object to which the new GRR will apply. In the preferred embodiment, the user then selects a GRR definition button (not shown) from within the object rule viewer window 90. When an existing GRR is to be edited, the user selects the GRR from a selected object's GRR set In the preferred embodiment, the GRR editor 36 signals the simulation viewer 34 to delineate or outline the subset of simulation grid elements in the scene displayed in the simulation viewer window 54 during GRR creation or editing as shown in FIG. 4A. The GRR editor 36 then signals the simulation viewer 34 to display the simulation context indicator 72 in the simulation viewer window 54. When a GRR is initially being defined, the simulation context indicator 72 encloses only the selected object and the simulation grid elements the selected object occupies. In the preferred embodiment, a previously-defined GRR can be edited only when the simulation state to which it corresponds appears in the scene currently displayed in the simulation viewer window 54. The simulation context indicator 72 can be advantageously adjusted by the user to span any subset of simulation grid elements containing the selected object, thereby defining the "before" portion of the GRR. This can be done by allowing the user to drag an drop graphical handles on each side of the simulation context indicator 72. As the simulation context indicator 72 is adjusted, the simulation viewer window 54, the "before" portion window 74, and the "after" portion window 76 are simultaneously updated.

The "before" portion of a GRR shows the selected object, a subset of simulation grid elements surrounding the selected objects, and any additional objects contained therein. The GRR's "before" portion maintains the positions of each additional object and each simulation grid element in the subset relative to the selected object, the occupancy of each simulation grid element in the subset, plus a set of hierarchical object classifications and a set of property conditions for the objects in the subset.

In the example considered herein, object $O_1$ has been defined as the selected object, and the simulation context indicator 72 has been adjusted to span the six simulation grid elements indicated by dashed lines in FIG. 4A. Within the six simulation grid elements spanned by the simulation context indicator 72, object $O_2$ is adjacent to object $O_1$ as shown. The "before" portion of the exemplary new GRR identified by the simulation context indicator 72 in FIG. 4A and its initial "after" portion are shown in the "before" portion window 74 and "after" portion window 76, respectively, in FIG. 4B.

In the definition of the GRR through programming by demonstration, the GRR editor 36 enables the user to demonstrate or define a corresponding sequence of actions to be performed by or to be performed upon one or more objects. Each action occurs within the subset of simulation grid elements identified by the simulation context indicator 72. In the preferred embodiment, the user can define object motion actions and property modification actions. An object motion action is defined by moving a selected object from either the object source menu 52 or a first simulation grid element to either the remove icon 97 or a second simulation grid element. A property modification action is defined by specifying a set of operations to be performed upon one or more object properties. Those skilled in the art will recognize that additional types of actions could also be defined. If the user selects the drawing editor icon 75 during GRR editing or definition, the drawing editor 42 allows the user to create an animated transition corresponding to an action. During simulation execution, performance of the action to which the animated transition corresponds causes one or more portions of an object's picture to be altered according to the animated transition. A single GRR may have several corresponding actions defined for the object in any of the manners indicated above. Each action alters the state of the selected object in the "after" portion window 76. In the preferred embodiment, an object's state is altered when the object's position changes, when one or more of the object's property values change, or when the object's visual appearance changes. If an action involves the movement of the object from one simulation grid element to another, the user can move the object in the simulation viewer window 54, or the user can move the object in the GRR editor's "after" portion window 76. Movement of the object in the simulation viewer window 54 automatically results in corresponding movement of the object in the "after" portion window 76, and vice versa.

In the preferred embodiment, the user indicates that a property modification action is to be defined or edited by selecting the property modification button 79. When the property modification button 79 is selected, the user can drag a selected property from the object property editor window 92 into a first predetermined region in the GRR editor window 70. The GRR editor 36 then assigns the value of the selected property to a first portion of an equation. The user can then specify the manner in which the selected property is to be modified. In the preferred embodiment, the user specifies this by defining or editing a calculation having a result that is to be assigned to the selected property. The calculation is displayed in a second predetermined region in the GRR editor window 70, and can include one or more constants, the values of one or more object properties, and one or more operators. If the user selects the calculator icon 73, a calculator window 81 (shown in FIG. 5B) is displayed to assist the user in definition of the calculation. In the preferred embodiment, the GRR editor 36 assigns the calculation to a second portion of the equation, and the equation is stored in RAM 22 after the property modification action has been defined.

THE ACTION RECORDER

For each action the user defines or demonstrates, the action recorder 38 automatically records and stores the action as a portion of a recording. Each recorded action indicates an exact operation that is to be performed by or upon a specific object.

THE ABSTRACTOR

After the action recorder 38 has recorded and stored an action, the abstractor 40 analyzes the recorded action, generalizes the recorded action, and creates a corresponding generalized computer program step sequence. The abstractor's generalization of the recorded action is referred to herein as event abstraction. In the preferred embodiment, event abstraction takes on two forms, namely, motion abstraction and property abstraction. Motion abstraction and property abstraction correspond to the generalization of object motion actions and property modification actions, respectively. During motion abstraction, exact object locations are generalized according to their relative position within the GRR's "before" portion. During property abstraction, specific property values are generalized. When executed, the generalized computer program step sequence results in the desired action being performed by or upon the object.

In the preferred embodiment, each action demonstrated by the user falls within a predefined number of possible action types. The abstractor 40 preferably stores each generalized computer program step sequence recorded for a given GRR sequentially in RAM 22. The set of generalized computer program step sequences generated is the GRR program. In the example considered herein, a first action is defined in FIG. 4C by moving object $O_1$ to the simulation grid element directly above object $O_2$. Following definition of the first action, the action recorder 38 automatically records the action as a first portion of a recording. The abstractor 40 then analyzes the first portion of the recording, and creates a generalized computer program step sequence corresponding to the fast action. A second action is defined in FIG. 4D by moving object $O_1$ to the simulation grid element directly to the right of object $O_2$. After definition of the second action, the action recorder 38 automatically records the second action as a second portion of the recording. The abstractor 40 then analyzes the second portion of the recording, and creates a generalized computer program step sequence corresponding to the second action. No further actions are defined in the current example. In the preferred embodiment, the user selects the completion button 71 when GRR definition or editing has been completed. After completion of GRR definition or editing, the GRR's "after" portion shows the state of the simulation context according to the final action the user had defined.

Figure 4E:
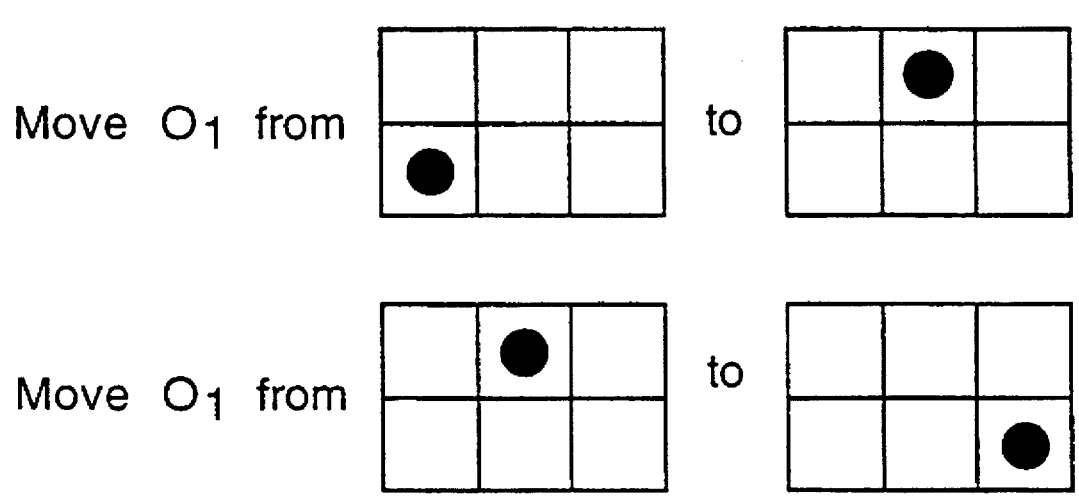

The GRR editor 36 enables the user to view in a mixed geographical and language form, the set of computer program step sequences defined for a given GRR. The GRR editor 36 of the present invention displays each computer program step sequence as a symbolic program step. In the preferred embodiment, the user selects the view program button 78 when symbolic program step display is required. Each symbolic program step provides the user with a visual indication of the object's behavior during execution of the GRR program. The symbolic program steps for the current example are shown in FIG. 4E. The first symbolic program step shows that object $O_1$ is to move from the lower-left simulation grid element in the subset to the upper-center simulation grid element. Similarly, the second symbolic program step shows that object $O_1$ is then to move from the upper-center simulation grid element in the subset to the lower-right simulation grid element. The representation of each computer program step sequence in symbolic form helps the user to understand the complete GRR program without specialized programming knowledge.

During the execution of a simulation, the simulation successively changes from one state to another as objects behave according to their corresponding Graphical Rewrite Rules. A given GRR's "before" portion matches a simulation state when the following conditions are satisfied: 1) the objects in the GRR's "before" portion occupy the same relative positions as a set of objects in the simulation state; 2) the simulation grid elements in the "before" portion are identical in number, relative position, and object occupancy to a subset of simulation grid elements surrounding the set of objects in the simulation state; 3) the objects in the GRR's "before" portion and the set of objects in the simulation state are related according to the set of hierarchical object classifications defined for the GRR; and 4) the set of objects in the simulation state satisfy the set of property conditions defined for the objects in the GRR's "before" portion.

During the definition of a new GRR corresponding to a selected object, the abstractor 40 preferably establishes default values for the set of hierarchical object classifications corresponding to the selected object and any additional objects in the GRR's "before" portion. In the preferred embodiment, the default hierarchical object classifications specify that the selected object is considered according to its name and any additional objects are considered according to their types when the GRR is tested for a match. A case in which object $O_1$ is defined as creature #5 and object $O_2$ is defined as gray rock #76 when the above exemplary GRR was defined is now considered. In this case, a first simulation state in which mature #5 and gray rock #76 occupy the lower-left and lower-center simulation grid elements, respectively, within a subset of simulation grid elements having positional and object occupancy relationships identical to those shown in the exemplary GRR's "before" portion obviously constitutes a match. A second simulation state that differs from the first simulation state in that gray rock #30 replaces gray rock #76 also constitutes a match because gray rock #76 and gray rock #30 have the same object type, namely, gray rock. Thus, as defined above, the exemplary GRR is applicable to both the first and the second simulation states.

PICTURE ABSTRACTION

Figure 5A:
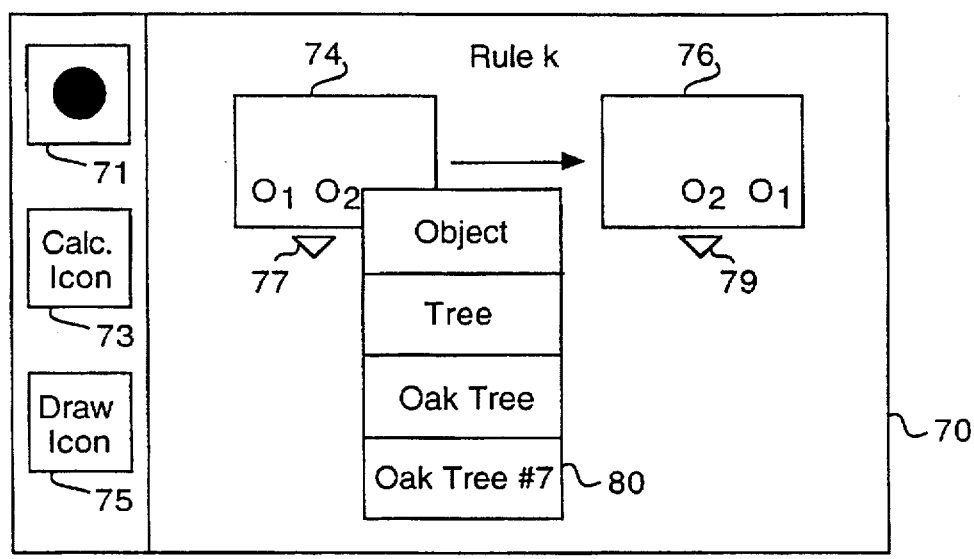
FIGS. 5A and 5B are block diagrams showing a portion of the user interface during an exemplary graphical rewrite rule abstraction.

For each object in a given GRR's "before" portion, other than the object to which the GRR corresponds, the abstractor 40 enables the user to abstract or modify the hierarchical object classifications that must be satisfied for the GRR to match. This is referred to as picture abstraction. In picture abstraction, the abstractor 40 allows the user to alter a given object's hierarchical classification according to object name, object type, or any supertype within the set of user-defined supertypes that is hierarchically related to the object's type. The abstractor 40 generates and displays a type hierarchy menu 80 within the GRR editor window 70 that allows the user to perform picture abstraction. Referring now to FIG. 5A, a block diagram of a preferred embodiment of a type hierarchy menu 80 within the GRR editor window 70 is shown. The type hierarchy menu 80 is associated with a user-selected object in a given GRR's "before" portion, other than the object to which the GRR corresponds. They type hierarchy menu 80 provides the user with a list showing the selected object's name, type, and related supertypes. The list is preferably arranged from the most general supertype to successively more specific supertypes, then the object's type and finally the object's name. In the preferred embodiment, the picture of the object shown in the GRR's "before" portion is changed according to the manner in which the user alters the object's hierarchical classification. For example, if the object's hierarchical classification is generalized, a generalized picture of the object is shown in the GRR's "before" portion. This provides the user with pictorial feedback that increases the user's understanding of when the GRR can match a simulation state. In the type hierarchy menu of FIG. 5A the user can select whether object $O_2$ or gray rock #76, respectively, will be tested for a match according to "gray rock #76", "rock", or whether any object will match. In the preferred embodiment, the type hierarchy menu 80 is a "pop-up" menu that appears when the user selects an object for picture abstraction.

The abstraction capabilities of the present invention are particularly advantageous because a single abstracted GRR can match multiple simulation states. This greatly reduces the number of rules the user must define and track. When fewer rules are defined, the user is more likely to understand which GRR was matched at a given stage in the simulation. This in turn improves the user's understanding of objects' actions in the simulation, and enhances the simulation's flexibility and ease of use.

PROPERTY CONDITION EDITING

The GRR editor 36 allows the user to define and modify the set of property conditions that must be satisfied for the GRR to match a simulation state. Each property condition can include one or more properties of the objects in the GRR's "before" portion. In the preferred embodiment, each property condition establishes a relationship between a property value of a specified object in the GRR's "before" portion and an expression. The expression can include one or more properties of any object in the GRR's "before" portion, including the object to which the GRR corresponds;

one or more constants; and one or more operators. The operators can include mathematical operators, Boolean operators, string operators, and existence operators.

Figure 5B:
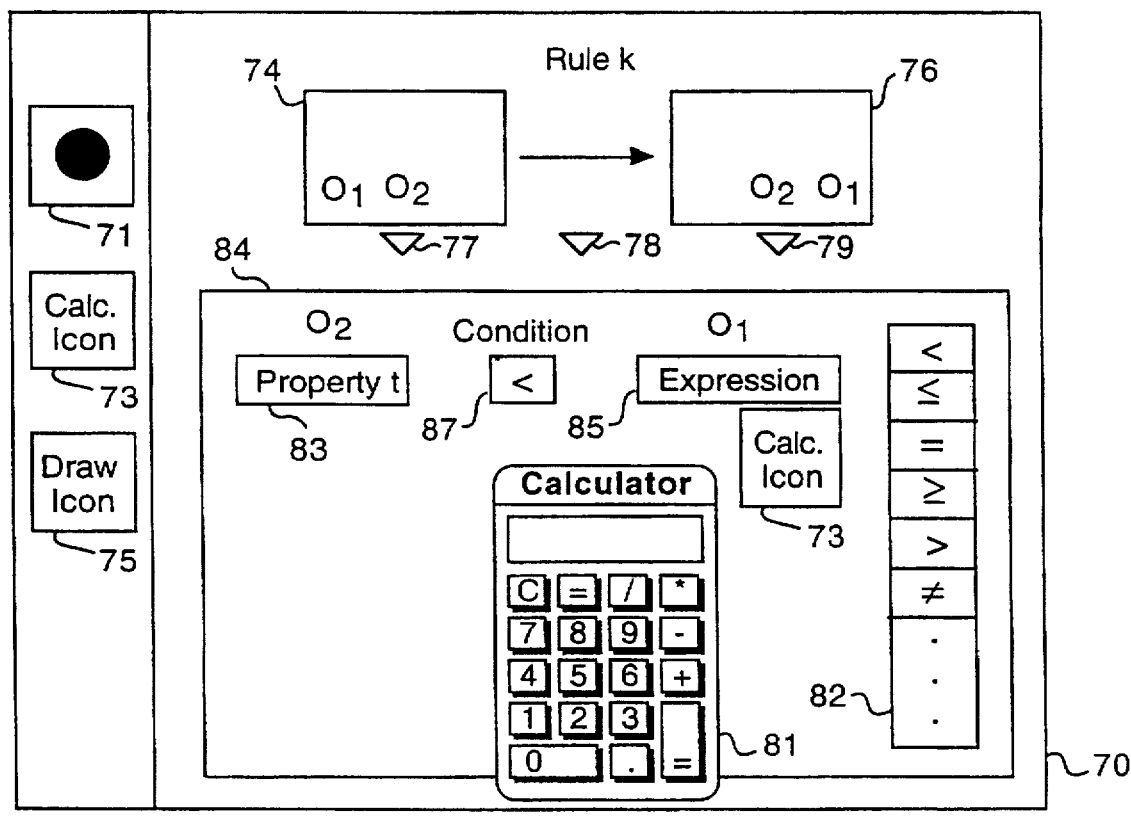

Property condition definition and editing is facilitated by a property condition window 84, a condition menu 82, a calculator window 81, a left-side box 83, a right-side box 85, a condition box 87, and a calculator icon 73 as shown in FIG. 5B. Each of these generated and displayed in the GRR editor window 70 by the GRR editor 36. the property condition window 84 allows the user to specify a property of a particular object; a condition selected from the condition menu 82; and an expression as described above. The condition is preferably a mathematical relational operator such as "greater than," "greater than or equal to," "equal to," "less than or equal to," "less than," and "not equal to"; a Boolean operator such as "AND," "OR," or "NOT"; a relational string operator such as "contained in"; or an existence operator.

The GRR editor 36 ensures that the selected object's property value, the conditions available to the user, the operators available to the user, and the contents of the expression defined in the property condition maintain combinational and operational consistency. For example, the GRR editor 36 does not allow the user to add a floating point constant to a text value, or to operate upon a text value with a Boolean operator. The GRR editor 36 thus preferably provides the user with choices for conditions and operators based upon the property the user specifies for the selected object.

The specified property can appear in either the left-side box 83 or the right-side box 85, and the selected condition appears in the condition box 87. In the preferred embodiment, the user places the specified property into either the left-side box 83 or the right-side box 85 by dragging the property from the object property editor window 92 into the desired box. After the specified property has been dragged into the desired box, the GRR editor 36 automatically places an "equals" operator in the condition box 87, and shows the current value of the specified property in the other box. The specified property, the equals operator, and the current value of the specified property serve to establish a default property condition, where the current value of the specified property is the initial expression. After the default property condition has been established, it can be modified by the user. The calculator window 81 provides the user with calculator functions during expression definition or modification. In the preferred embodiment, the calculator window 81 is displayed when the user selects the calculator icon 73. If the user has used calculator functions during expression editing, another instance of the calculator icon 73 is also displayed below the box containing the expression, as shown in FIG. 5B. In the preferred embodiment, the user initiates and terminates property condition definition or editing by selecting the property condition button 77 displayed in the GRR editor window 70. Once the user has completed property condition definition or editing, the abstractor 40 generalizes the property condition, and then stores the property condition in RAM 22.

THE SIMULATION EXECUTION CONTROLLER

The simulation execution controller 50 controls the execution of a simulation, and allows the user to interrupt simulation execution to perform simulation programming activities. The simulation execution controller 50 generates and displays an execution control window 56 as shown in FIGS. 3A, 3B, and 3C that allows the user to selectively control simulation execution. During the execution of a simulation, the simulation execution controller 50 sequentially tests Graphical Rewrite Rules in each object's GRR set for a match with a simulation state. For the fast match detected in a given object's GRR set, the simulation execution controller 50 executes the GRR program for the matching GRR that the user has previously defined through programming by demonstration. This in turn results in the movement of one or more objects in the simulation state, the modification of one or more object properties, or both. When an object is to move from one simulation grid element to another, the simulation execution controller 50 updates the object location list stored in RAM. When a match occurs in a portion of the simulation that is currently displayed as a scene in the simulation viewer window 54, the simulation viewer 34 redisplays the scene and each object within the scene as the object location list is updated. In this manner, the user can visually follow the behavior of each object in the displayed scene. After GRR program execution has been completed, the updated portion of the simulation corresponds to the matching GRR's "after" portion.

In the preferred embodiment, the simulation execution controller 50 sequentially tests the Graphical Rewrite Rules in a given object's GRR set only until a matching GRR has been found or until each GRR in the object's GRR set has been tested. Within each GRR set, Graphical Rewrite Rules are preferably ordered in a first-to-last user-defined sequence. The simulation execution controller 50 selects each GRR for testing according to this sequence. Once the simulation execution controller 50 finds the first matching GRR, any remaining Graphical Rewrite Rules in the object's GRR set are not tested for a match. Rather, after execution of the GRR program corresponding to the matching GRR, the simulation execution controller 50 proceeds to test the Graphical Rewrite Rules in another object's GRR set.

For an object having one ore more Graphical Rewrite Rules in its GRR set, the simulation execution controller 50 retrieves a first GRR from RAM 22. The GRR's "before" portion includes the set of hierarchical object classifications and the set of property conditions that were defined during GRR creation or during abstraction. The simulation execution controller 50 first tests the GRR for a match according to any picture abstraction that has been defined. If the objects and the simulation grid elements corresponding to the GRR match a simulation state according to any picture abstractions, the GRR is next tested for a match according to property abstractions. In the testing according to property abstractions, the simulation execution controller 50 sequentially tests each property condition in the GRR's property condition set. For each property condition, the simulation execution controller 50 calculates the value of its expression, and then compares the property specified in the property condition against the value of the expression according to the selected condition. If all comparisons are true according to each condition indicated in the set of property conditions, the GRR program is executed.

THE EXECUTION CONTROL MENU

Through the execution control menu 56, the simulation execution controller 50 provides the simulation user with a means for controlling the sequential execution of a simulation and a means for viewing the current execution of the simulation. The execution control menu 56 comprises a simulation clock window 58, a stop button 60, a single step forward button 62, a repeated step forward button 64, a single step backward button 66, and a repeated step backward button 68. The simulation execution controller 50 maintains an internal simulation timer that is incremented as the simulation is sequentially executed. The state of the simulation timer and therefore the current execution state of the simulation is indicated by the simulation clock window 58.

The simulation execution controller 50 sequentially executes a simulation as follows: 1) the simulation execution controller 50 increments the simulation timer and updates the simulation clock window 58; 2) for each object in the simulation, Graphical Rewrite Rules in the object's GRR set are sequentially tested for matches; and 3) for the first matching GRR in each object's GRR set, the corresponding GRR program is executed, causing the simulation viewer window 54 to be updated. If the user selects the repeated step forward button 64, steps 1 through 3 are successively repeated for forward time progression until the user selects the stop button 60. If the user selects the single step forward button 62, steps 1 through 3 above are performed only once for forward time progression.

The execution of a GRR program results in a set of actions being performed by or upon one or more objects. In the preferred embodiment, the user can initiate one or more actions during a simulation's execution by interacting with the simulation in a predetermined number of ways. For example, the user can add an object to the simulation. This causes the simulation execution controller 50 to perform a "stop" action, followed by an "add object" action, followed by a "resume" action. Similarly, the user can delete an object from the simulation, giving rise to a "stop" action, a "delete object" action, and a "resume" action. Each predetermined user interaction causes the simulation execution controller 50 to increment the simulation timer prior to performing the actions associated with the interaction.

When a given action is performed by or upon an object, the state of the object changes. In the preferred embodiment, for each possible type of action the user can define through programming by demonstration during GRR definition, a corresponding "undo" action exists. If a given action and its corresponding "undo" action are successively performed, the "undo" action returns the object to the state it was in prior to the performance of the given action.

For each increment of the simulation timer, the simulation execution controller 50 stores in an action list an account of each action that has been performed and the object to which it corresponds. In the preferred embodiment, the action list is stored in RAM 22. Through the single step backward button 66, the simulation execution controller 50 enables the user to sequentially reverse or "undo" those actions that had been performed during the previous simulation timer increment. When the user selects the single step backward button 66, the simulation execution controller 50 first decrements the simulation timer. The simulation execution controller 50 then sequentially executes in reverse order the "undo" action corresponding to each action that was entered in the action list for the current simulation timer value. If the user selects the repeated step backward button 68, the simulation execution controller 50 repeats the steps described above until the user selects the stop button 60. In this manner, the simulation execution controller 50 allows the user to run a simulation backwards to any desired point up to the beginning of execution.

When the user has selected the stop button 60, the simulation execution controller 50 completes the current simulation execution cycle. Following its completion, the user can perform functions related to GRR definition, editing, and abstraction; perform property editing functions; and manually change the set of objects in the simulation through object insertion, object deletion, and placement of objects in the time-out region 55. In addition, the user can continue simulation execution by selecting either the single step forward button 62 or the repeated step forward button 64; or reverse the simulation by selecting the single step backward button 66 or the repeated step backward button 68.

The GRR editor 36 generates and displays a buttons icon 49 as shown in FIGS. 3A, 3B, and 3C. When simulation execution has been interrupted and the user selects the buttons icon 49, the GRR editor 36 displays on a buttons page one or more rule testing buttons (not shown). The GRR editor 36 enables the user to define Graphical Rewrite Rules for each rule testing button. Thus, each rule testing button has its own set of Graphical Rewrite Rules. If the user selects a given rule testing button during simulation execution, the simulation execution controller 50 tests only those Graphical Rewrite Rules corresponding in the rule testing button's GRR set following the next simulation timer increment, rather than testing Graphical Rewrite Rules for each object in the simulation.

THE OBJECT FOLLOWER WINDOW

In the preferred embodiment, a simulation may be defined to have a number of simulation grid elements that span an area that is larger than the simulation viewer window 54. An object can therefore move beyond one of the simulation viewer window's boundaries and out of the user's view. The simulation viewer 34 generates and displays the object follower window 96 to allow the user to continuously track or follow a selected object during simulation execution, thereby ensuring that the selected object is displayed in the simulation viewer window 54 throughout the simulation's execution. In the preferred embodiment, the user indicates that an object is to be followed by moving or "dragging" the object from the simulation viewer window 54 into the object follower window 96.

THE OBJECT PROPERTY DISPLAY

Figure 6:
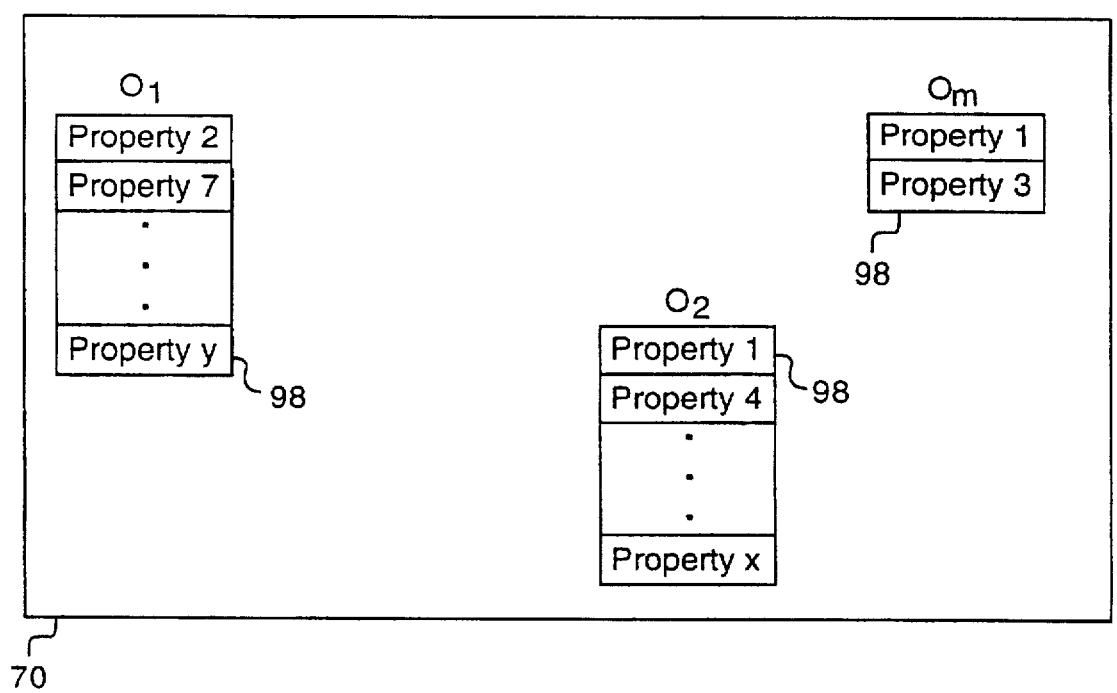
FIG. 6 illustrates a preferred embodiment of a heads-up object property display of the present invention.

During the execution of a simulation, one or more properties of a given object may be updated. The simulation viewer 34 advantageously provides the user with heads-up object property display 98 for tracking selected properties associated with one or more objects located within the scene displayed in the simulation viewer window 54. Referring now to FIG. 6, a preferred embodiment of a heads-up object property display 98 is shown. The heads-up object property display 98 comprises a pull-down graphical window containing a list of user-selected properties associated with a user-selected object. The heads-up object property display 98 allows the user to monitor the selected properties of each selected object that is present in the currently-displayed scene. The heads-up object property display 98 is particularly advantageous because its position is modified on the output device 16 with each of the object's movements such that the heads-up object property display 98 effectively follows or is attached to the object. This in turn provides the user with a better understanding of actions occurring within the simulation.

While the elements of the extensible simulator 30 have been described as performing actions, those skilled in the art will recognize that each element preferably comprises computer program steps for controlling the CPU 12.

Figure 7:
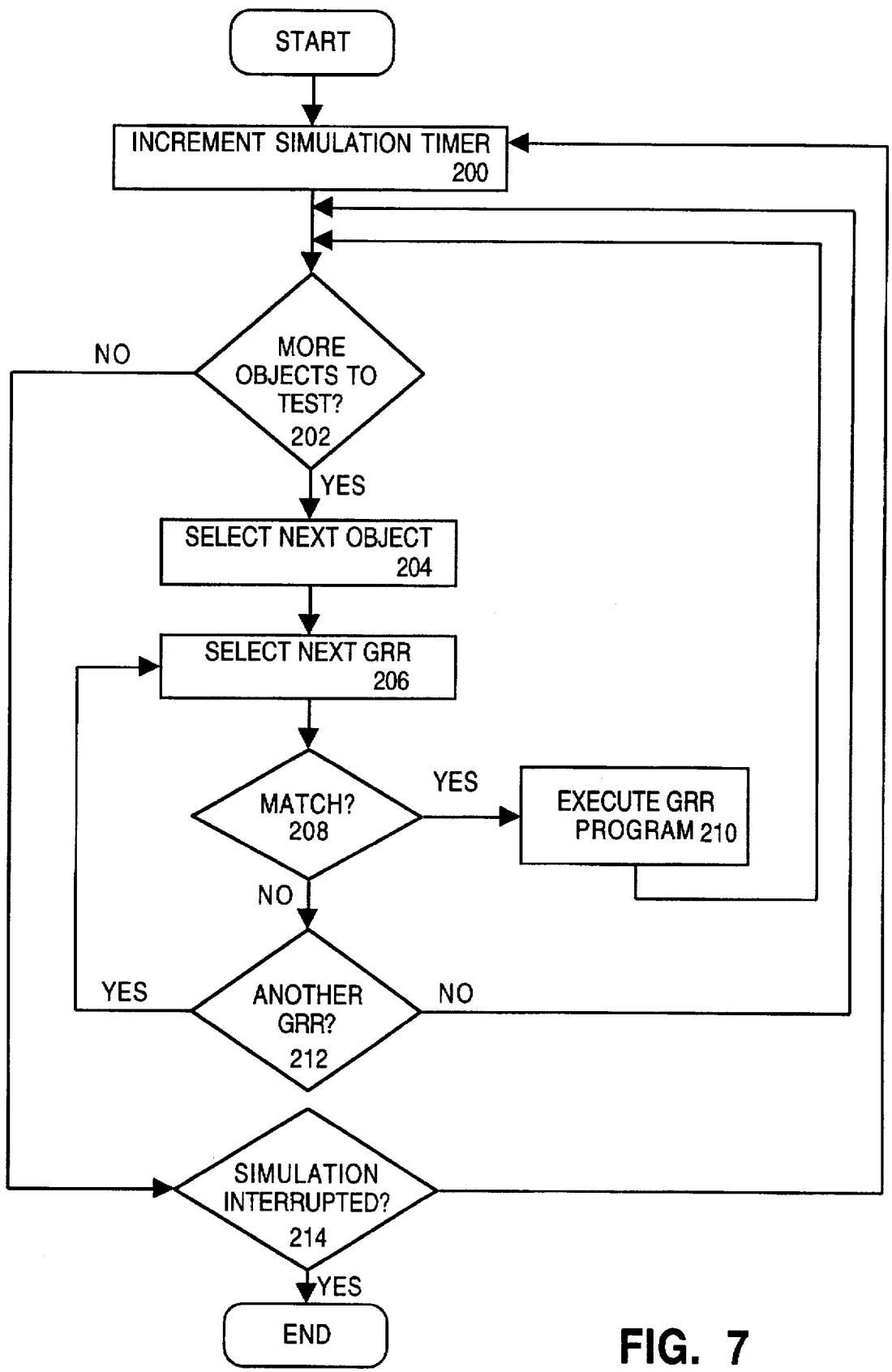
FIG. 7 is a flowchart showing a preferred simulation execution method of the present/invention.

Referring now to FIG. 7, a flowchart of the preferred method for simulation execution is shown. The preferred method begins in step 200 with the simulation execution controller 50 incrementing the simulation timer. Next, in step 202, the simulation execution controller 50 determines whether additional objects in the simulation are to be tested for matches to a current simulation state. In the preferred embodiment, only those objects having Graphical Rewrite Rules in their corresponding GRR sets are tested. Within each simulation timer increment, all objects having Graphical Rewrite Rules in their GRR sets are tested once. If in step 202 the simulation execution controller 50 determines that at least one additional object having Graphical Rewrite Rules in its GRR set remains to be tested during the current simulation timer increment, the simulation execution controller 50 selects a next object in step 204. Following step 204, the simulation execution controller 50 selects a next GRR in step 206. Within the selected object's GRR set, Graphical Rewrite Rules are preferably ordered from first-to-last in a user-defined sequence. Selection of each GRR proceeds according to this first-to-last ordering.

After step 206, the simulation execution controller 50 determines if the selected GRR matches a current simulation state (step 208). A match to a current simulation state is defined as described above. If a match exists, the simulation execution controller 50 executes the corresponding GRR program in step 210. Following step 210, control passes back to step 202.

If at step 208 the simulation execution controller 50 determines that the selected GRR does not match a current simulation state, the preferred method determines in step 212 if another GRR in the selected object's GRR set requires testing. If so, the preferred method proceeds to step 206. If no Graphical Rewrite Rules in the selected object's GRR set require testing, the preferred method returns to step 202.

If in step 202 the simulation execution controller 50 determines that no additional objects require testing, the simulation execution controller 50 determines in step 214 whether the user has interrupted the simulation. In the preferred embodiment, simulation interruption occurs when the user selects the stop button 60. If the simulation has not been interrupted, the preferred method proceeds to step 200 to continue the execution of the simulation. If the simulation has been interrupted, the preferred method ends.

Figure 8:
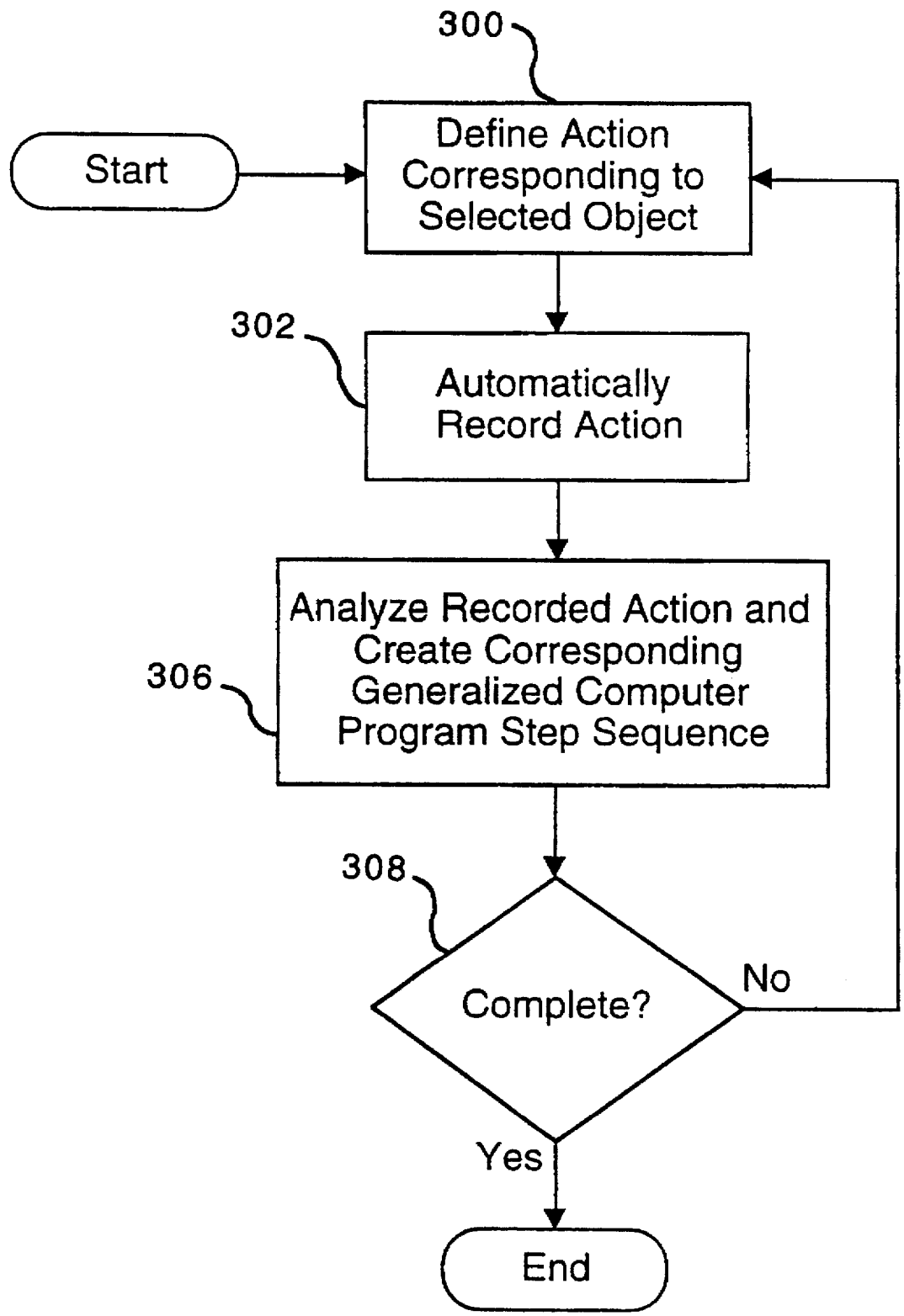
FIG. 8 is a flowchart of a preferred method for programming by demonstration in the present invention.

Referring now to FIG. 8, a flowchart of a preferred method for programming by demonstration in the present invention is shown. The preferred method begins in step 300 with the user demonstrating or defining an action corresponding to an object shown in a GRR's "before" portion. Next, in step 302, the action recorder 38 automatically records the demonstrated action as a portion of a recording. The abstractor 40 analyzes the recorded action, and creates a corresponding generalized computer program step sequence in step 306. Following step 306, the action recorder 38 determines whether the user has completed programming by definition. If not, the preferred method returns to step 300. If programming by definition has been completed, the preferred method ends.

Figure 9A:
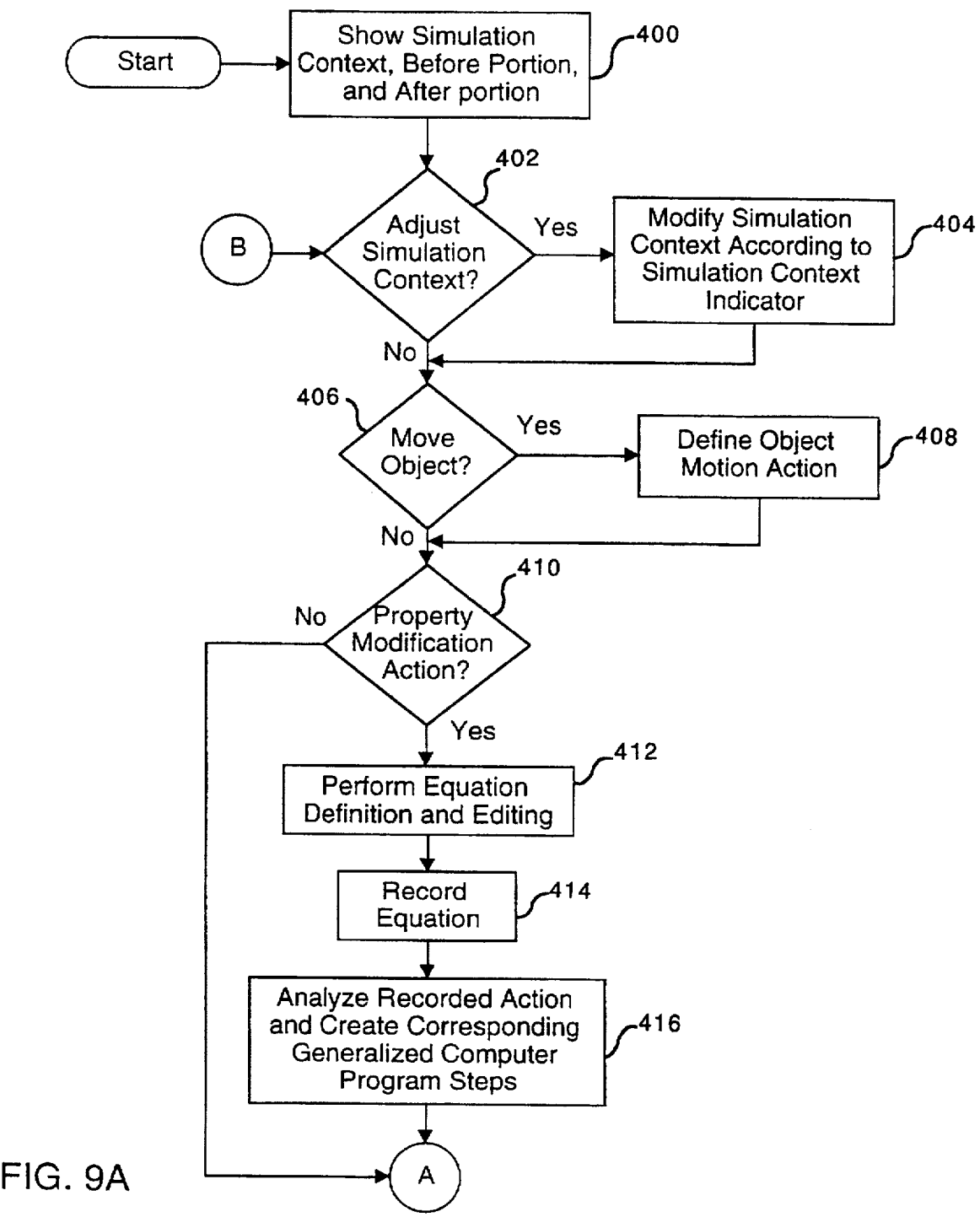
FIG. 9A and 9B are a flowchart of a preferred graphical programming method in accordance with the present invention.
Figure 9B:
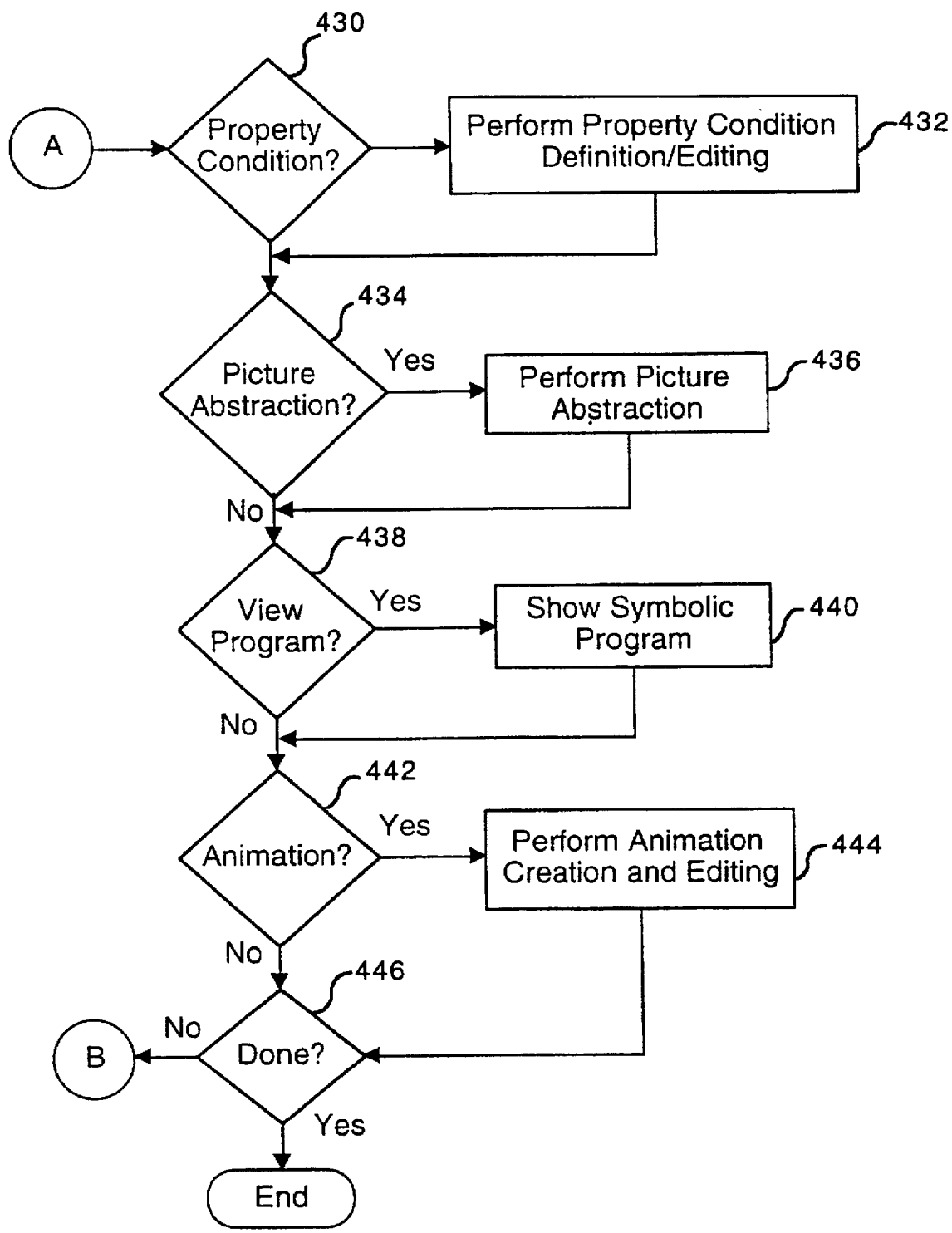

Referring now to FIGS. 9A and 9B, a flowchart of a preferred graphical programming method in accordance with the present invention is shown. The preferred method begins in step 400 with the GRR editor 36 and the simulation viewer 34 showing the simulation context, the "before" portion, and the "after" portion corresponding to a GRR in step 400. When a GRR is initially defined, its simulation context, its "before" portion, and its "after" portion show the object to which the GRR corresponds and the simulation grid elements the object occupies. Next, in step 402, the GRR editor 36 determines whether the simulation context has been adjusted. Preferably, the user adjusts the simulation context by positioning the simulation context indicator 72 in the simulation viewer window 54. If in step 402 the GRR editor 36 determines that the user has adjusted the simulation context, the GRR editor 36 sets the simulation context to the subset of simulation grid elements surrounded by the simulation context indicator 72, the selected object, and any additional objects contained therein in step 404. In step 404, the GRR editor 36 also includes in the simulation context information specifying object occupancies in the subset of simulation grid elements, the set of hierarchical object classifications, and the set of property conditions. After step 404, or if the GRR editor 36 determines in step 402 that the simulation context has not been adjusted, the GRR editor 36 determines whether an object in the GRR's "before" portion or in the simulation viewer 54 has been moved in step 406. If so, the action recorder 38 and the abstractor 40 define an object motion action in step 408. If the GRR editor 36 determines that an object has not moved in step 406, or following step 408, the GRR editor 36 determines whether a property modification action is to be defined or edited in step 410. Preferably, the user indicates that a property modification action is to be defined or edited by selecting the property modification button 79. If a property modification action is to be defined or edited, the GRR editor 36 performs equation definition and editing in step 412. Following step 412, the action recorder 38 records the equation as a portion of a recording in step 414. Next, in step 416, the abstractor 40 analyzes the recorded equation and creates a corresponding generalized computer program step sequence that can implement the required property modification action.

After step 416, or following step 410 if the GRR editor 36 determines that no property modification action is to be defined or edited, the GRR editor 36 determines whether the property condition definition or editing is required in step 430. If so, the GRR editor 36 performs property condition definition or editing in step 432. If in step 430 the GRR editor 36 determines that property condition definition or editing is not required, or after step 432, the GRR editor 36 determines whether picture abstraction is required in step 434. Preferably, the user indicates that picture abstraction is required by selecting an object shown in the GRR's "before" portion. If picture abstraction is required, the abstractor 40 performs the necessary picture abstraction in step 436.

If the GRR editor 36 determines in step 434 that picture abstraction is not required, or following step 436, the GRR editor 36 determines whether the GRR program is to be shown. The user preferably indicates that the GRR program is to be shown by selecting the view program button 78. If the GRR program is to be shown, the GRR editor 36 shows the symbolic program steps corresponding to the GRR program in step 440.

After step 440, or after step 438 if the GRR program is not to be shown, the GRR editor 36 determines whether an animation is to be defined or edited. Preferably, the user indicates that an animation is to be defined or edited by selecting the drawing editor icon 75 from within the GRR editor window 70. If the GRR editor 36 determines in step 442 that an animation is to be defined or edited, the drawing editor 42 performs the animation definition or editing in step 444.

If the GRR editor 36 determines that no animation is to be defined or edited in step 442, or after step 444, the GRR editor 36 determines in step 446 whether graphical programming is complete. In the preferred method, the user indicates that graphical programming is complete by selecting the completion button 71. If graphical programming is to continue, the preferred method returns to step 402. If graphical programming is complete, the preferred method ends.

Figure 10:
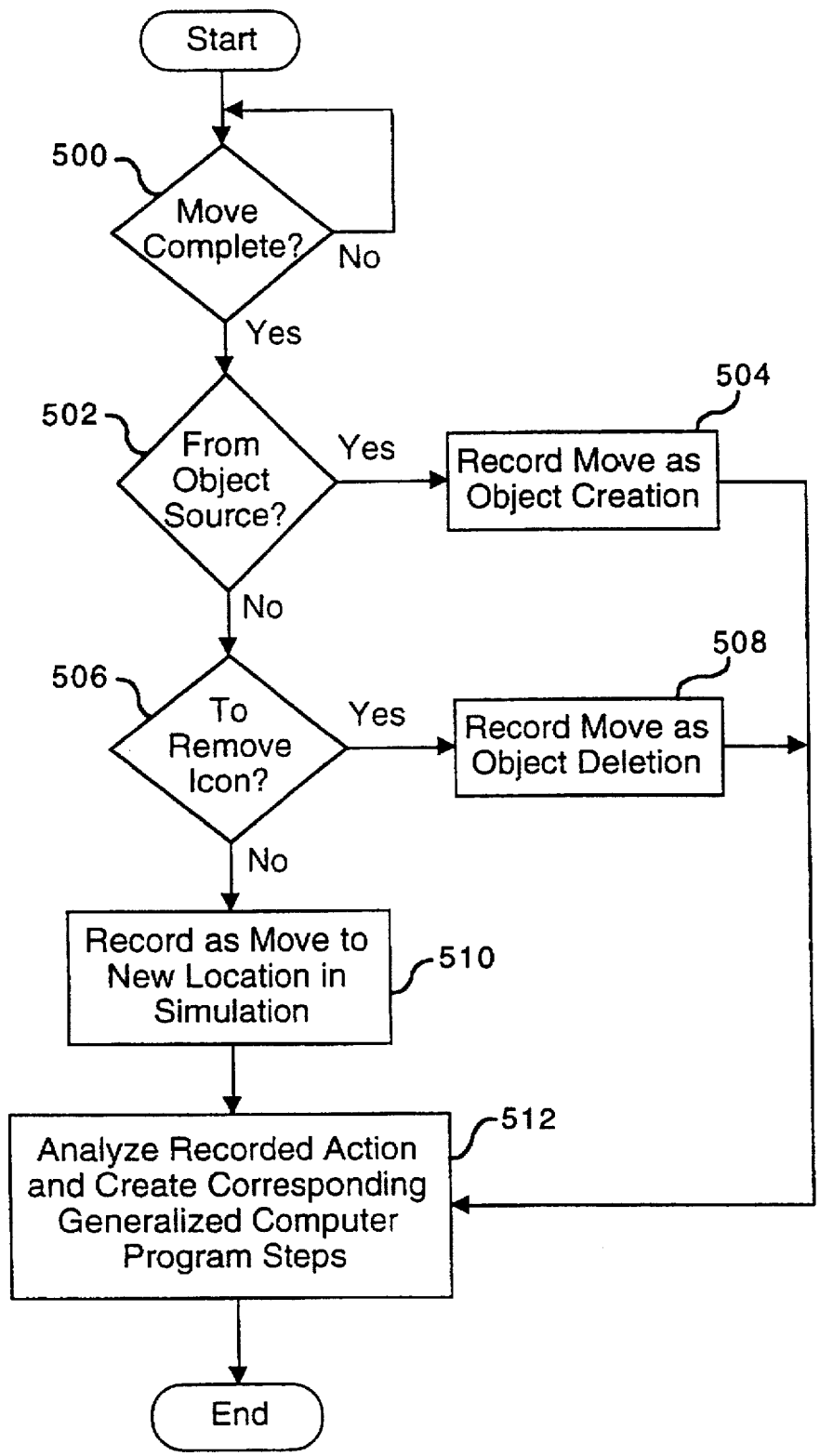
FIG. 10 is a flowchart of a preferred method for defining an object motion action in the present invention.

Referring now to FIG. 10, a flowchart of a preferred method for defining an object motion action (step 408 of FIGS. 9A and 9B) is shown. The preferred method begins in step 500 with the action recorder 38 determining whether the object motion has been completed. Preferably, object motion is completed after the user has deselected the object. If the object motion has not been completed, the preferred method remains in step 500. Once the object motion has been completed, the action recorder 38 determines whether the object has been moved from the object source to the GRR's "before" portion or to the simulation viewer window 54 in step 502. If the object has been moved in this manner, the action recorder 38 records the action as an object creation in step 504. If the action recorder 38 determines that the object has not been moved from the object source in step 502, the action recorder 38 determines whether the object has been moved to the remove icon 97 in step 506. If so, the action recorder 38 records the action as an object deletion in step 508. If the action recorder 38 determines in step 506 that the object was not removed to the remove icon 97, the action recorder 38 records the action as a move from a first simulation grid element to a second simulation grid element in step 510. After step 504, step 508, or step 510, the abstractor 40 analyzes the recorded action and creates a corresponding generalized computer program step sequence that can carry out the desired object motion action in step 512. Following step 512, the preferred method ends.

Figure 11A:
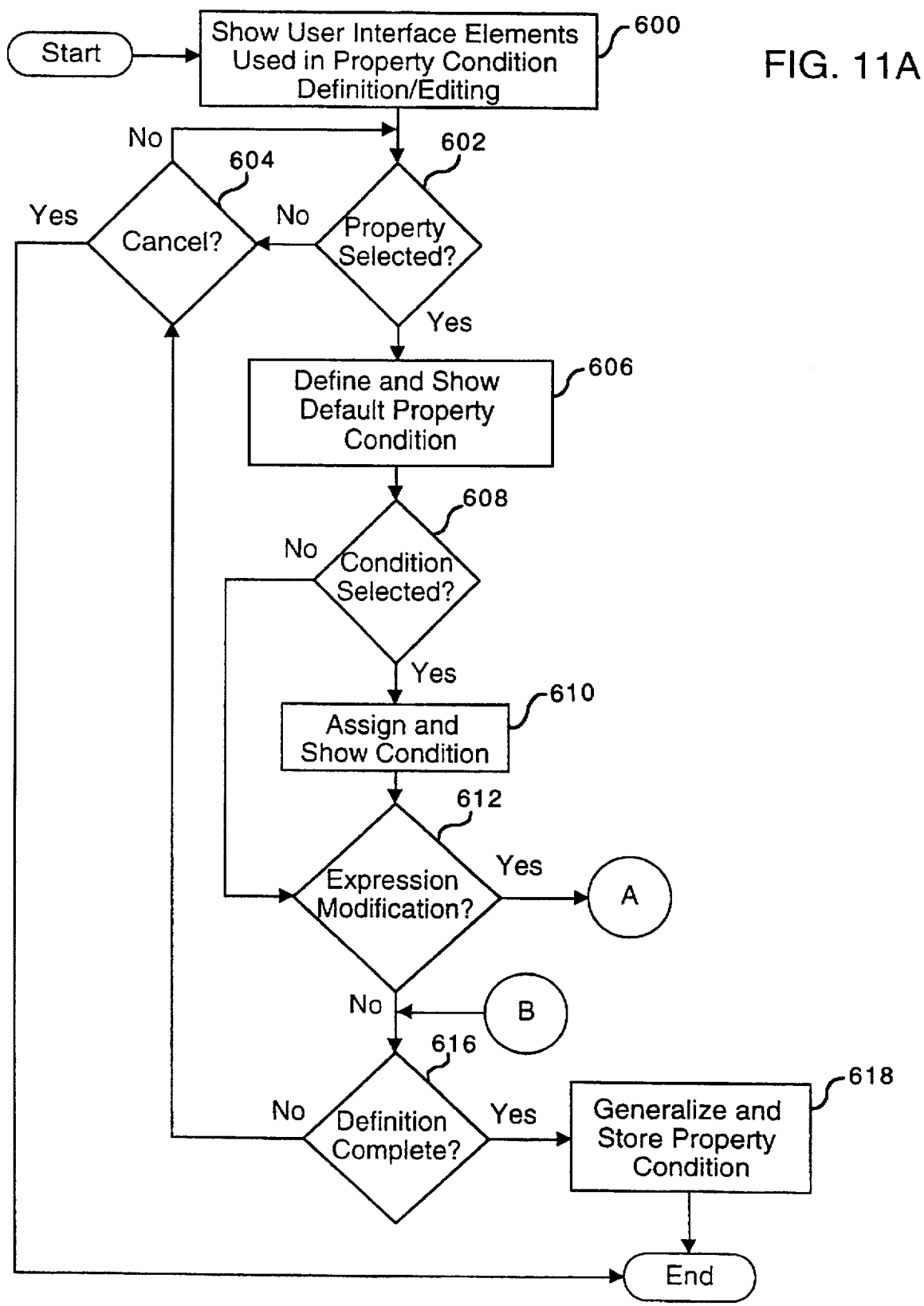
FIGS. 11A and 11B are a flowchart of a preferred method for defining or editing a property condition in the present invention.
Figure 11B:
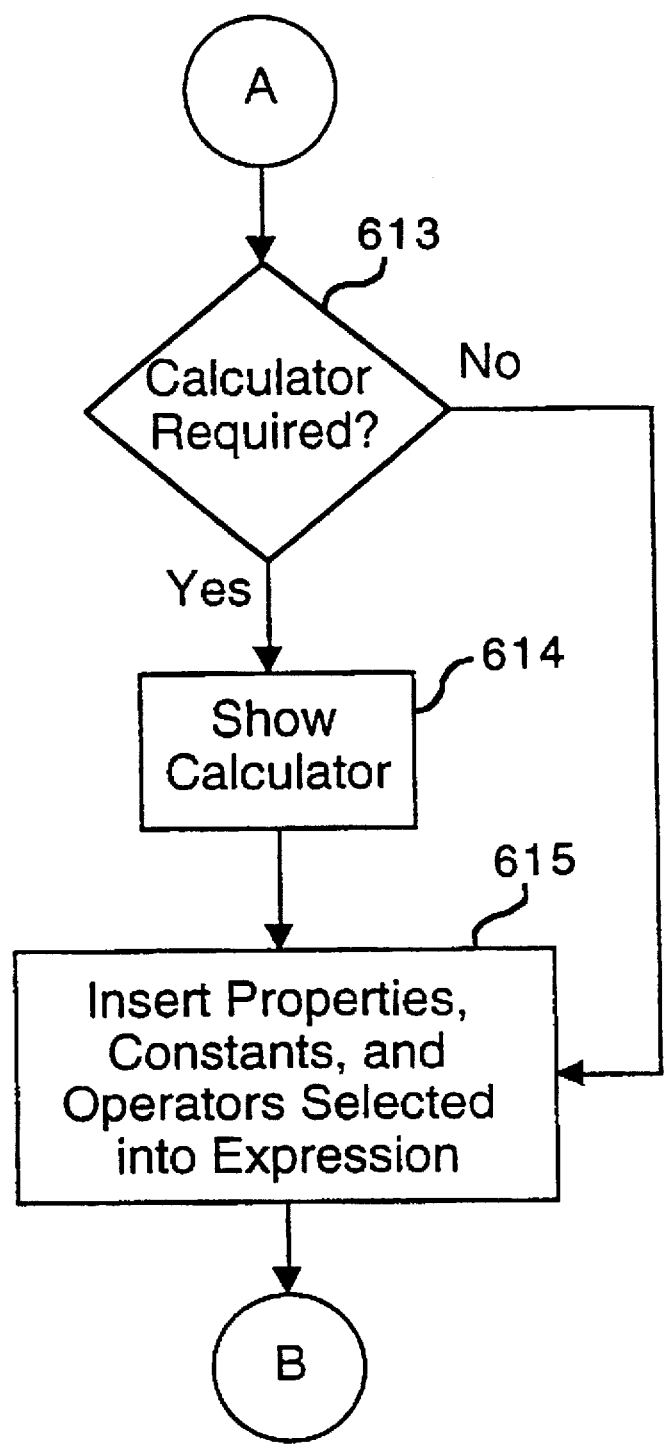

Referring now to FIGS. 11A and 11B, a flowchart of a preferred method for defining or editing a property condition in the present invention is shown. The preferred method begins in step 600 with the GRR editor 36 displaying the user interface elements that are used in property condition definition or editing. These preferably include the property condition window 84, the condition menu 82, the calculator window 81, the left-side box 83, the right-side box 85, the condition box 87, and the calculator icon 73. In addition, the calculator window 81 is selectively displayed as described below. The GRR editor 36 then determines in step 602 whether the user has selected a property. In the preferred embodiment, the user selects a property by dragging a given object's property that is displayed in the object property editor window 92 into either the left-side box 83 or the right-side box 85. If the user has not selected a property, the GRR editor 36 determines whether property condition definition or editing is to be canceled in step 604. If property condition definition or editing is to be canceled, the preferred method ends. In the preferred embodiment, the user indicates cancellation of property condition definition or editing by selecting a cancellation button. If property condition definition or editing is to continue, the preferred method returns to step 602.

If the GRR editor 36 determines in step 602 that the user has selected a property, the GRR editor 36 defines and shows the default property condition in step 606. In the preferred embodiment, the selected property, an equals condition, and the current value of the selected property form the default property condition. The current value of the selected property is initially the property condition's expression. Following step 606, the GRR editor 36 determines in step 608 if the user has selected a condition from the condition menu 82. If so, the GRR editor 36 assigns the selected condition to the property condition in step 630. After step 630, or if the GRR editor 36 determines that the user has not selected a condition in step 608, the GRR editor 36 determines whether the user has begun modification of the expression in step 612. If so, the GRR editor 36 determines whether the user requires calculator functions in step 613. Preferably, the user indicates that calculator functions are required by selecting the calculator icon 73. If the GRR editor 36 determines in step 613 that the user requires calculator functions, the GRR editor 36 displays the calculator window 81 in step 614. After step 614, or if the GRR editor 36 determines in step 613 that the user does not require calculator functions, the GRR editor 36 inserts any properties, constants, or operators into the expression in step 615 as they are selected or input by the user. Following step 615, or if the GRR editor 36 determines in step 612 that the user is not modifying the expression, the GRR editor 36 determines in step 616 if definition or editing of the property condition is complete. If so, the abstractor 40 generalizes the property condition, and then stores the property condition in RAM 22 in the property condition set associated with the GRR in step 618. After step 618, the preferred method ends. If the GRR editor 36 determines that the property condition definition is not complete in step 616, the preferred method returns to step 604.

Figure 12:
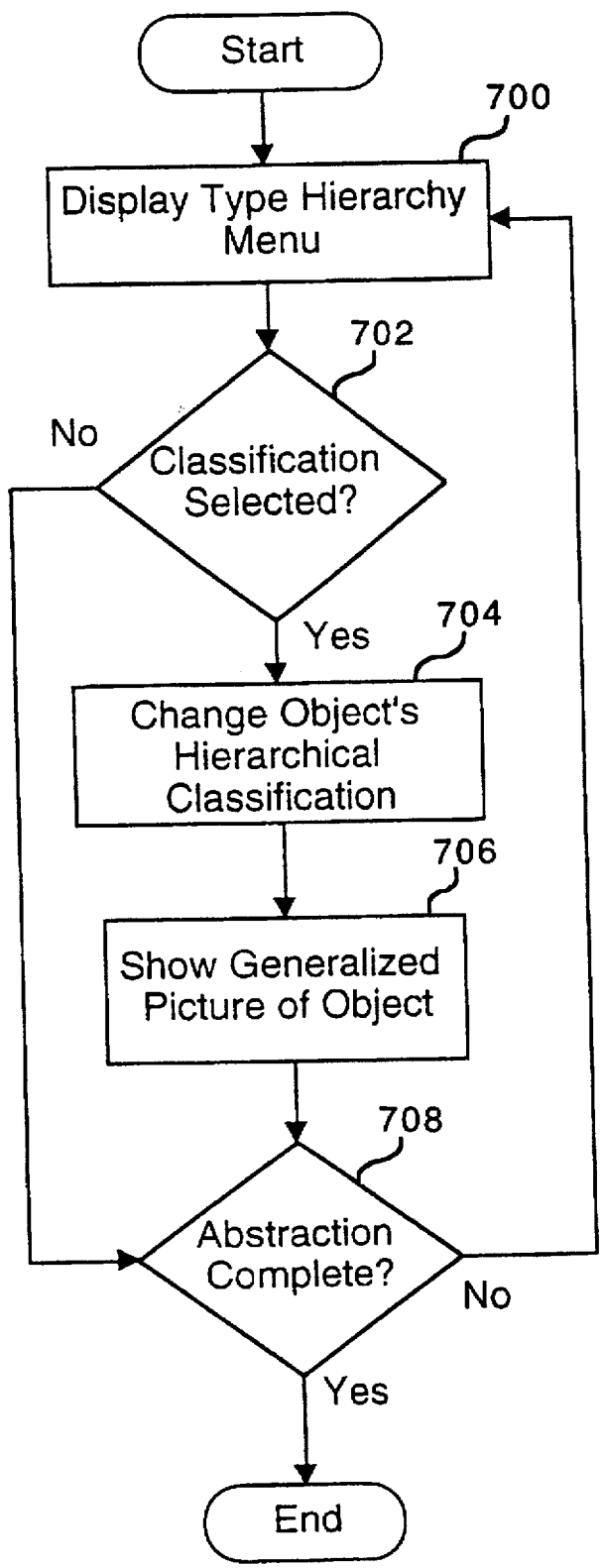
FIG. 12 is a flowchart of a preferred method for performing picture abstraction in the present invention.

Referring now to FIG. 12, a flowchart of a preferred method for performing picture abstraction (step 436 of FIG. 9) in the present invention is shown. The preferred method begins in step 700 with the abstractor 40 generating and displaying the type hierarchy menu 80 corresponding to the selected object. The type hierarchy menu 80 preferably shows each user-defined supertype that applies to the selected object, the selected object's type, and the selected object's name arranged in a most-general to most-specific order. In the preferred embodiment, the abstractor 40 implements the type hierarchy menu 80 as a "pop-up" menu. The abstractor 40 then determines if the user has selected a hierarchical classification from the type hierarchy menu 80 in step 702. If the user selects a hierarchical classification, the abstractor 40 changes the object's hierarchical classification by adding the selected classification to the GRR's hierarchical classification set in step 704. When the GRR is tested for a match, the selected object and a corresponding object within a simulation state are tested to determine whether they are hierarchically related according to the selected hierarchical classification. Following step 704, the abstractor 40 alters the object's picture in the GRR's "before" portion in step 706, according to the hierarchical object classification the user has selected. If a more general hierarchical classification has been selected, the object's picture in the GRR's "before" portion is generalized accordingly. Next, in step 708, the abstractor 40 determines if picture abstraction is complete. If picture abstraction is not complete, the preferred method returns to step 700. If the abstractor 40 determines that picture abstraction is complete in step 708, the preferred method ends. Preferably, the user indicates that picture abstraction is complete by deselecting the selected object.

SUBROUTINES

In traditional programming languages, a subroutine is a named body of code, optionally accepting one or more parameters. Typically, the same subroutine can be called from many places within a program, thereby allowing programmers to reuse subroutine code. In addition, subroutines allow programmers to hide detail. For example, in the portion of the program that calls the subroutine, the multiple instructions within the subroutine are represented by a single instruction which calls the subroutine. Further, the individual functions of the instructions in subroutines typically combine to define a larger function. Therefore, the use of subroutines allows programmers to break programs up into conceptually-related modules. Finally, the use of subroutines often facilitates debugging, since many program environments allow subroutines to be debugged independently of the rest of the program.

As mentioned above, the present invention supports GRR subroutines. As will be described in greater detail hereafter, the GRR subroutines supported by the present invention provide some of the same benefits as traditional subroutines, as well as other benefits particularly useful in simulation environments.

TERMINOLOGY

In the following description of GRR subroutines, terms will have the following meanings: "Subroutine" is a grouped set of one or more GRRs and subroutines. A "target object" of a particular GRR set is the simulation object whose behavior is affected by the GRR set during the performance of a simulation. The "corresponding rules" of a subroutine are the GRR rules that are implemented in the subroutine. The "visual subroutine indicator" of a subroutine is a visually displayed representation of a subroutine. A "corresponding rule indicator" is a visually displayed representation of a corresponding rule.

OBJECT RULE VIEWER WINDOWS

Figure 13:
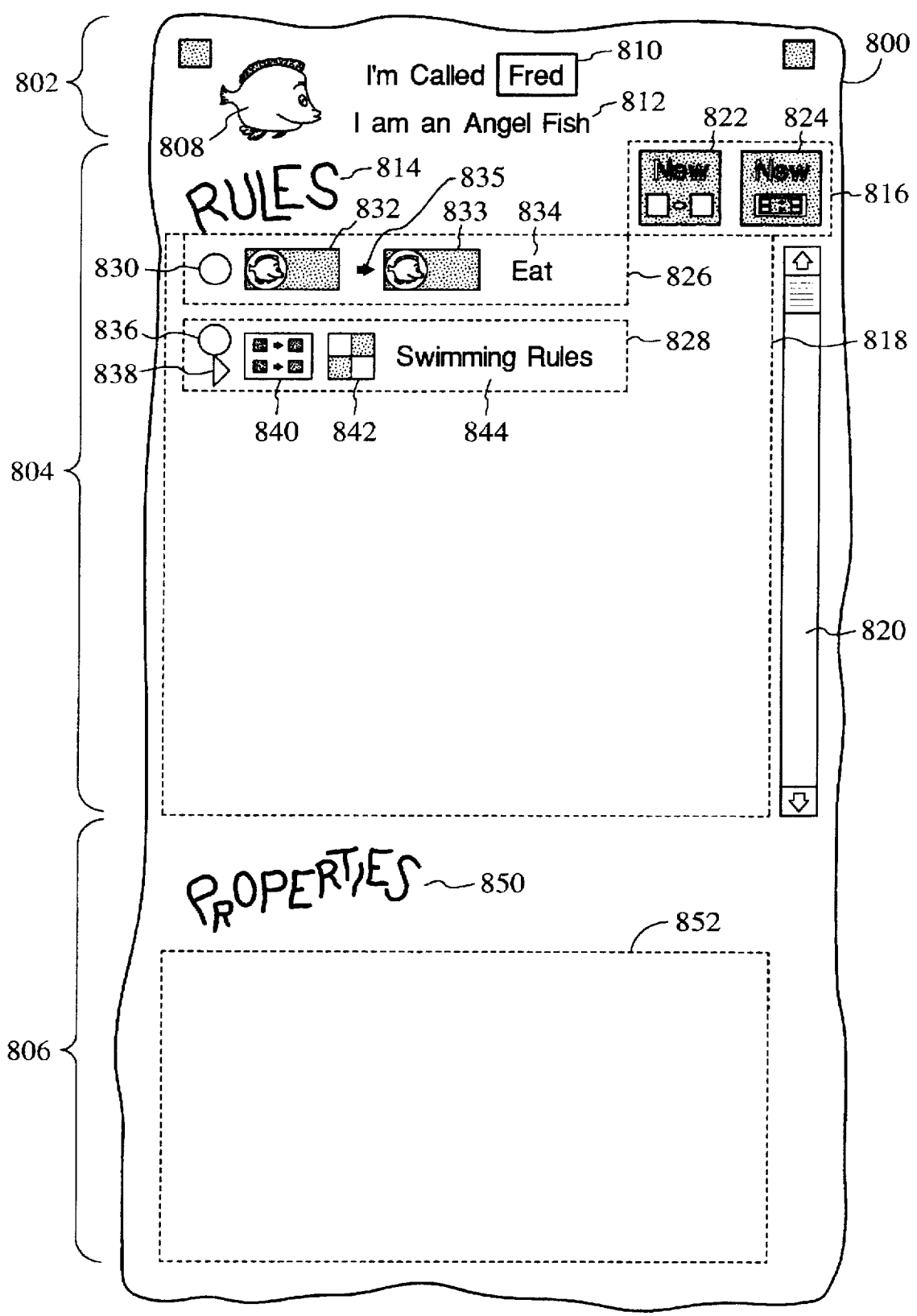
FIG. 13 illustrates an object role viewer window that contains a visual subroutine indicator according to the presently preferred embodiment of the invention.

Referring to FIG. 13, it illustrates an object viewer window 800 according to the presently preferred embodiment of the invention. As explained above, a user may open an object rule viewer window for a class of simulation objects (e.g. Angelfish) or a particular instance of a simulation object (e.g. Fred the Angelfish). The object viewer window 800 includes three general sections: a header section 802, a rule section 804 and a property section 806. The header section 802, rule section 804 and property section 806 respectively serve to identify a simulation object, identify rules and subroutines for the simulation object, and identify properties of the simulation object. Each of these sections shall now be described in greater detail.

The header section 802 includes visual indicators that identify the simulation object associated with the object viewer window 800. The rules and subroutines represented in the object viewer window 800 determine the simulation behavior of the object identified in the header section 802. Therefore, the simulation object identified in the header section 802 is the "target object" for the rules and subroutines represented in object viewer window 800.

In the illustrated example, the target object for object viewer window 800 is an instance object "Fred" of a class object "Angelfish". To identify the target object, header section 802 includes an image 808 that the user has associated with the target object, an instance indicator 810 that indicates the name of the target object, and a class indicator 812 that indicates the name of the class of the target object.

The property section 806 includes a section identifier 850 and a property specification region 852. Section identifier 850 serves to identify the property section 806 from the other sections of object viewer window 800. In the preferred embodiment, section identifier 850 is simply a stylized graphic of the word "PROPERTIES". Property specification region 852 contains visual indications of the properties that have been associated with the target object. In the illustrated example, no properties have been associated with the target object, so the property specification region 852 is empty.

The rule section 804 includes a section identifier 814, a rule creation control region 816, a GRR set region 818 and a rule scrollbar 820. The section identifier 814 serves to identify the rule section 804 from the other sections of object viewer window 800. In the preferred embodiment, section identifier 814 is simply a stylized graphic of the word "RULES". The rule creation control region 816 contains controls for creating new rules and/or subroutines for the target object. In the illustrated example, rule creation control region 816 contains a rule creation icon 822 for creating a new rule for the target object and a subroutine creation icon 824 for creating a new subroutine for the target object GRR set region 818 includes a visual indicator for each of the rules and subroutines that have been established for the target object. In the present example, one rule and one subroutine have been created for Fred the Angelfish. Therefore, GRR set region 818 includes one visual rule indicator 826 and one visual subroutine indicator 828. If the visual indicators for all of the rules and subroutines associated with the target object do not fit within the GRR set region 818, then as many as can fit are displayed. The user may then operate scroll bar 820 to cause GRR set region 818 to scroll, and thereby determine which rules and subroutines are currently displayed.

VISUAL RULE INDICATORS

Each visual rule indicator corresponds to a corresponding rule that applies to the target object. In the preferred embodiment, each visual rule indicator consists of four general components: a tracing light 830, a precondition image 832, a postcondition image 833 and a rule name indicator 834. Precondition image 832 visually depicts a state that must exist in the simulation environment for the corresponding rule to execute. Postcondition image 833 visually depicts the state that will exist after the corresponding rule executes. An arrow 835 points from the precondition image 832 to the postcondition image 833 to visually convey the idea of transformation. Rule name indicator 834 visually depicts a name that the user has associated with the corresponding rule.

The tracing light 830 gives the user visual feedback during the performance of a simulation. Specifically, if during the performance of a simulation the generalized computer steps of the corresponding rule are executed, then tracing light 830 turns green. As explained above, the generalized computer steps are executed when the rule is tested and the preconditions for the rule are satisfied. If, on the other hand, the corresponding rule is tested and any precondition to the rule is not satisfied, then the tracing light 830 turns red. If a rule has not yet been tested during a clock tick, tracing light 830 remains white.

VISUAL SUBROUTINE INDICATORS

Each visual subroutine indicator corresponds to a subroutine that applies to the target object. As explained above, a subroutine is a grouped set of graphical rewrite rules. Therefore, the subroutine represented by a visual subroutine indicator may contain multiple corresponding rules. A visual subroutine indicator preferably includes a tracing light 836, an open/close control 838, a subroutine symbol 840, a subroutine type indicator 842 and a subroutine name indicator 844.

Subroutine symbol 840 indicates that visual subroutine indicator 828 is a subroutine indicator and not a rule indicator. Preferably all visual subroutine indicators include subroutine symbol 840, thereby creating a clear and consistent visual distinction between visual subroutine indicators and visual rule indicators.

Subroutine name indicator 844 identifies the name that the user has given to the subroutine represented by visual subroutine indicator 828. In the present example, the user has given the name "swimming rules" to the subroutine that is represented by visual subroutine indicator 828. Subroutine name indicator 844 differs from rule name indicator 834 in that subroutine name indicator 844 corresponds to a set of rules, while rule name indicator 834 corresponds to a single rule. Each rule in the set of rules will typically have its own name, distinct from the name of the subroutine to which it belongs.

During the performance of a simulation, tracing light 836 functions similar to tracing light 830, with the exception that tracing light 836 turns green if any one of the rules that belong to the subroutine represented by visual subroutine indicator 828 is successfully tested, and turns red only when all the corresponding rules are tested and fail.

Open/close control 838 is a user interface control that may be operated by a user to toggle visual subroutine indicator 828 between an open state and a closed state. The operation of open/close control 838 will be described in greater detail below.

OPEN/CLOSED SUBROUTINE INDICATOR STATES

The open/close state of a visual subroutine indicator determines whether the rule indicators of the rules that belong to the corresponding subroutine are displayed. When the visual subroutine indicator is in an open state, the corresponding rule indicators are displayed. When the visual subroutine indicator of the subroutine is in a closed state, the corresponding rule indicators are not displayed.

In FIG. 13, visual subroutine indicator 828 is illustrated in a closed state. In the illustrated example, a closed state is represented by a triangle pointing to the fight. Therefore, GRR set region 818 does not include a display of the visual rule indicators of the rules that belong to the "swimming rules" subroutine.

By operating open/close control 838, a user may cause visual subroutine indicator 828 to switch to an open state. In the preferred embodiment, a user operates open/close control 838 by clicking on the open/close control 838. In response to a click on the open/close control 838, the orientation of open/close control 838 is altered, and the corresponding rule indicators are displayed.

Figure 14:
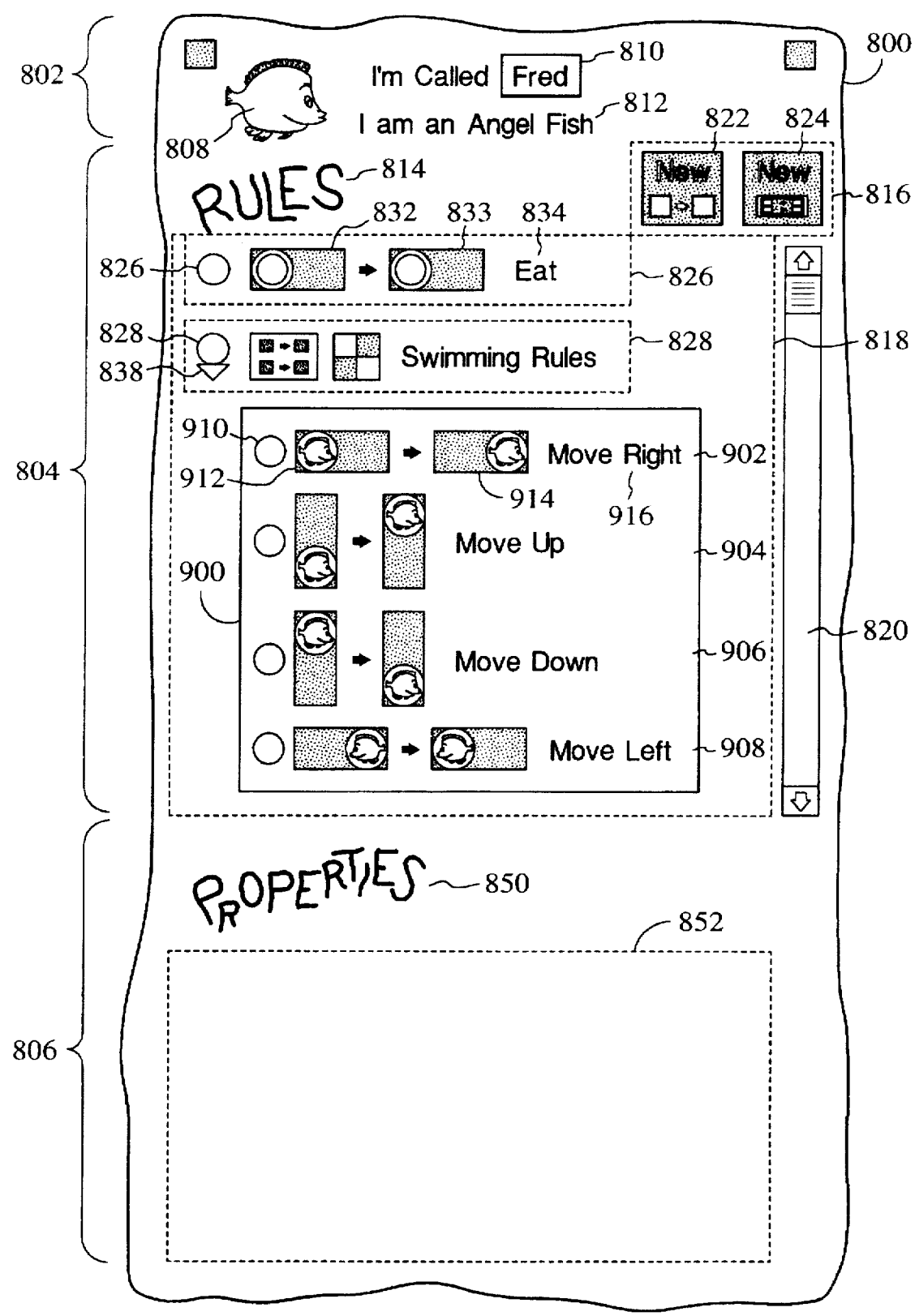
FIG. 14 illustrates the object viewer window of FIG. 13 with a subroutine in an open state.

Referring to FIG. 14, it illustrates open/close control 838 in an open state. In the illustrated example, the open state is indicated by a downward pointing triangle. In response to user input that places open/close control 838 in the open state, a subroutine display region 900 is displayed within GRR set region 818. Subroutine display region 900 is similar to GRR set region 818 in that it contains an ordered list of visual rule indicators. The visual rule indicators displayed within subroutine display region 900 correspond to the rules in the "swimming rules" subroutine represented by visual subroutine indicator 828.

In the illustrated example, the "swimming rules" subroutine includes four rules. The four rules are visually represented within subroutine display region 900 by visual rule indicators 902, 904, 906 and 908. In the preferred embodiment, visual rule indicators that are displayed within a subroutine display region have the same visual components as visual rule indicators that are not displayed in subroutine display regions. For example, visual rule indicator 902 has a tracing light 910, a precondition image 912, a postcondition image 914 and a rule name indicator 916, just as does visual rule indicator 826.

If visual subroutine indicator 828 is open during the performance of a simulation, the tracing lights of the visual rule indicators within subroutine display region 900 function in the same manner as described above. That is, if the generalized computer instructions of the rule corresponding to the visual rule indicator are executed, the visual rule indicator turns green. If the rule corresponding to the visual rule indicator is tested but the preconditions of the rule are not satisfied, then the visual rule indicator turns red.

As is illustrated in FIG. 14, the visual rule indicators within a subroutine display region are separated from rules outside the display region in a visually distinct manner. In the illustrated example, a visible border surrounds subroutine display region 900. In addition, subroutine display region 900 (and the visual rule indicators contained therein) are indented relative to other visual rule indicators within GRR set region 818 (e.g. visual rule indicator 826). This visual separation allows a user to easily distinguish between indicators for rules that belong to a subroutine and indicators for rules that do not.

SUBROUTINE TYPES

Figure 15:
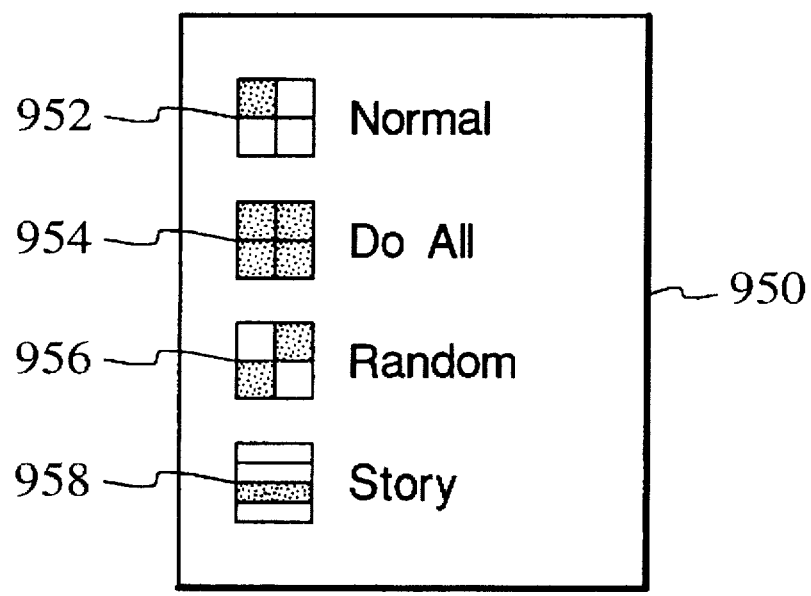
FIG. 15 illustrates a pop-up menu for selecting a "subroutine type" for a subroutine.

Subroutine type indicator 842 identifies the type of subroutine that corresponds to the subroutine rule indicator 828. The type of a subroutine determines how the rides in the subroutine are processed during the performance of a simulation. In the preferred embodiment, four types of subroutines are supported: normal, do-all, random, and story. FIG. 15 illustrates the four subroutine rule indicators associated with these four types of subroutines according to one embodiment of the invention.

Referring to FIG. 15, it illustrates a subroutine type select menu 950. In the preferred embodiment, subroutine type select menu 950 is displayed when a user selects (e.g. by a mouse click) the subroutine type indicator 842 of a subroutine. Subroutine type select menu 905 includes a normal subroutine indicator 952, a do-all subroutine indicator 954, a random subroutine indicator 956 and a story subroutine indicator 958. When a user selects one of the subroutine type indicators from subroutine type select menu 950 for a subroutine, the selected subroutine type is established for the subroutine. More specifically, (1) the subroutine type select menu 950 disappears (2) the subroutine type indicator within the visual subroutine display is changed to reflect the symbol associated with the selected type of subroutine, and (3) the generalized computer program instructions for the subroutine are updated to reflect the execution rules associated with the selected type of subroutine. The various types of subroutines, and their associated execution rules, shall now be described in greater

NORMAL SUBROUTINES

Normal subroutines are subroutines that execute based on the same principles that apply to GRR sets in general. As explained above, the general execution rule is that rules in a GRR set are tested one-by-one in sequential order from the top to the bottom until a rule "matches". A rule matches when the current conditions of the simulation satisfy all of the preconditions for the rule. Once a matching rule is encountered, the generalized computer instructions associated with the rule are executed. The execution of any role in a GRR set terminates the current round of processing of the GRR set. The next time the GRR set is processed, the rule matching process will begin again with the first role in the GRR set.

Applying this general execution rule to a subroutine, a "normal" subroutine is processed by testing the rules within the normal subroutine one-by-one in order from the top to the bottom. If a matching rule is encountered within the subroutine, then the generalized program instructions corresponding to the rule are executed and the processing of the subroutine stops. The next time the subroutine is tested, the rule matching process begins again with the first rule in the subroutine.

The execution of any rule within a subroutine constitutes an execution of the subroutine. Within a GRR set, normal subroutines are treated as if they were rules. That is, the execution of a normal subroutine ends the processing of a GRR set just as the execution of any single rule within the GRR set would end the processing of the GRR set.

Returning to the example illustrated in FIG. 14, for the purposes of explanation it shall be assumed that the "swimming rules" subroutine represented by visual subroutine indicator 828 is a normal subroutine. During the performance of a simulation, simulation execution controller 50 determines what to do with the visual object associated with "Fred the Angelfish" by processing the rules represented in GRR set region 818. First, the rule corresponding to visual rule indicator 826 will be processed. If the preconditions associated with the rule are satisfied, then simulation execution controller 50 will cause the visual "Fred" object to behave according to the rule. The execution of the rule associated with visual rule indicator 826 would terminate all processing for "Fred" for the current simulation timer increment. During the next simulation timer increment, processing for "Fred" will begin again with the rule associated with visual rule indicator 826.

If the preconditions for the rule associated with visual rule indicator 826 are not satisfied, then execution control passes to the subroutine associated with visual subroutine indicator 828. The rules associated with visual rule indicators 902, 904, 906 and 908 are processed one-by-one in sequence. If the preconditions for any one of the rules is satisfied, then the generalized computer instructions associated with the rule are executed. The execution of any one of rules within the "swimming rules" subroutine terminates all processing for "Fred" for the current simulation timer increment. During the next simulation timer increment, processing for "Fred" will begin again with the rule associated with visual rule indicator 826.

RANDOM SUBROUTINES

All subroutine types aside from "normal" subroutines deviate from the general execution process described above. Random subroutines deviate from the general rule in that after the execution of one of the rules within a subroutine, the order of the rules within the subroutine is randomly scrambled. This scrambling of the rules within a subroutine has no effect on the sequence in which rules are tested within a simulation timer increment, but will alter the order in which the rules are tested from one simulation timer increment to the next.

For example, assume that the "swimming rules" subroutine shown in FIG. 14 is a random subroutine. During a first simulation timer increment, the rules of the "swimming rules" subroutine may be ordered according to the order of their respective visual rule indicators 902, 900, 906 and 908. That is, the rule corresponding to visual rule indicator 902 will be tested first. If it does not match, then the rule corresponding to visual rule indicator 904 will be tested, etc.

As with normal subroutines, the processing of the "swimming rule" subroutine will cease upon the execution of any of the rules within the "swimming rule" subroutine. Upon the completion of the execution of the "swimming rule" subroutine, the order of the rules within the "swimming rule" subroutine is scrambled. Assume, for example, that during this scrambling, the rule associated with visual role indicator 906 is assigned the first position, the rule associated with visual rule indicator 904 is assigned the second position, the rule associated with visual rule indicator 908 is assigned the third position, and the rule associated with visual rule indicator 902 is assigned the forth position.

In the preferred embodiment, the visual rule indicators are rearranged within the subroutine display region 900 to reflect the new order of the corresponding rules. Therefore, based on the new role sequence described above, visual role indicators 906, 904, 908 and 902 will be respectively displayed at the fast, second, third and fourth positions within subroutine display region 900. Consequently, during the subsequent simulation timer increment, the rule associated with visual rule indicator 906 would be tested first. If it did not match, then the rule associated with visual rule indicator 904 would be tested, etc.

By scrambling the order of the rules contained within random subroutines, a random quality is added to the behavior of the target object. For example, if during a simulation, the visual object associated with "Fred" is in open water, then the preconditions for all of the swimming rules may be satisfied. Therefore, based on the general execution process, the first rule within the subroutine will always be executed. Under those "open water" conditions, if "swimming rules" is a normal subroutine, "Fred" would simply repeat the action defined by rule 902 during every simulation timer increment. However, if the "swimming rules" subroutine is a random subroutine, then the behavior of "Fred" will vary from simulation timer increment to simulation timer increment based on which of the rules in the "swimming rules" subroutine was assigned to the first position within the subroutine during the most recent scrambling operation.

DO-ALL SUBROUTINES

Do-all subroutines differ from normal subroutines in that (1) execution of the do-all subroutine does not stop with the first rule that matches, and (2) execution of the GRR set for a particular object does not stop with the execution of a do-all subroutine. Rather, execution of a do-all subroutine continues until every rule within the subroutine that matches has been executed, then testing proceeds to the rule or subroutine that follows the do-all subroutine in the object's GRR set.

For example, assume that the "swimming rules" subroutine shown in FIG. 14 is a do-all subroutine. During simulation timer increments in which the rule associated with visual rule indicator 826 does not match, the rules associated with visual rule indicators 902, 904, 906 and 908 will all be tested. Further, each rule will be tested regardless of the outcome of the other tests. Thus, if the rule corresponding to visual indicator 902 matches and is executed, the rule corresponding to visual rule indicator 904 will still be tested.

Do-all subroutines are particularly useful for rules that a user wants to execute every simulation timer increment ("bookkeeping rules"), but which should not preempt the normal behavior of a simulation object. For example, it may be desirable to have a rule that increases an "age" property of a simulation object. To simulate a uniform aging process, the aging rule should be executed at a uniform rate (e.g. once every simulation timer increment). However, under the general execution process, it is not possible to both ensure a constant aging rate and maintain normal object behavior. For example, if the aging rule is placed first in an object's GRR set, the general execution process prevents any other rule from executing. Therefore, the simulation object would not be able to do anything but age. On the other hand, if any rules are placed before the aging rule in the GRR set, then the aging rule will not be executed during those intervals in which any one of the rules above the aging rule is performed.

By placing bookkeeping rules in a do-all subroutine, bookkeeping rules may be implemented without otherwise affecting the behavior of a simulation object. Specifically, during each simulation timer increment, zero, some, or all of the bookkeeping rules within the do-all subroutine may execute. Regardless of whether any such bookkeeping rules were executed, execution control will continue to test any other rules within the do-all subroutine, and proceed to test any rules or subroutines that follow the do-all subroutine.

Certain functions may be performed by do-all subroutines that would be difficult or impossible to perform in single rule operations. For example, consider the function of counting the number of objects that are adjacent to a simulation object in the simulation viewer window 54. In the preferred embodiment, there are eight grid locations adjacent to any given object. Each of the grid locations has two possible states: occupied or empty. Therefore, the number of possible object-to-adjacent square combinations is 256. It would be extremely tedious to implement 256 individual rules to determine the number of objects in adjacent squares. However, this same task may be performed by a single do-all subroutine that contains eight rules, each of which tests one of the adjacent squares to determine the presence of an object.

STORY SUBROUTINES

Unlike normal subroutines, story subroutines do not always begin testing at the top of the subroutine's list of rules. Rather, a story subroutine starts testing at the rule indicated by a pointer, which is referred to herein as the "current rule". Initially, the pointer points to the first rule within the story subroutine. Thus, the first rule is initially the "current rule". During a simulation timer increment, the only rule in the subroutine that is tested is the current rule. The other rules within the subroutine are ignored, regardless of the outcome of the test. If the preconditions associated with the current rule are satisfied, then the generalized computer instructions associated with the rule are executed and the pointer moves to the next rule within the story subroutine. If the current rule does not match, then the pointer does not move. After the last rule in the story subroutine executes, the pointer wraps around to point again at the first rule in the subroutine.

In the preferred embodiment, a current rule indicator is displayed to identify the visual rule indicator of the current rule. The current rule indicator may be, for example, an arrow or finger. The current rule indicator serves as a bookmark to the user. That is, the current rule indicator indicates the current location in the "story" defined by the behavior rules in the story subroutine.

Story subroutines allow users to set up scenarios to be executed in a simulation. For example, a fish might leave its home, go looking for food, eat food, and then return home. The outcomes of such scenarios may vary significantly based on the behavior of other simulation objects in the simulation.

SUBROUTINE PRETESTS

As explained above, each graphical rewrite rule may have a number of preconditions. During a simulation, these preconditions are tested to determine whether the behavior defined by the rule should be executed. Within any given list of rules, there may be a number of rules that share the same precondition. For example, a fish may have ten rules about how to behave when a shark is located at the grid position to the right of the fish. Thus, all ten of the rules would include the precondition specifying "GridRight=Shark". Typically, each of the ten rules will include some other precondition as well. For example, one rule may apply if the fish is in open water when the shark approaches and another rule may apply if the fish is surrounded by other sharks when the shark appears.

Normally, a user would have to go through the steps for establishing the "GridRight=Shark" precondition for each of the ten rules. This process may become tedious. To avoid the need to repeatedly specify common preconditions, the presently preferred embodiment of the invention allows users to specify preconditions for subroutines. Once a precondition has been established for a subroutine, then the rules contained in the subroutine need not have the precondition.

During the performance of a simulation, the preconditions that have been established for a subroutine are tested before any of the rules within the subroutine are tested. If the preconditions for the subroutine are satisfied, then the rules within the subroutine are tested according to the rules that apply to that particular type of subroutine. If the preconditions for the subroutine are not satisfied, then the "pretest" of the subroutine fails and none of the rules within the subroutine are tested.

Figure 16:
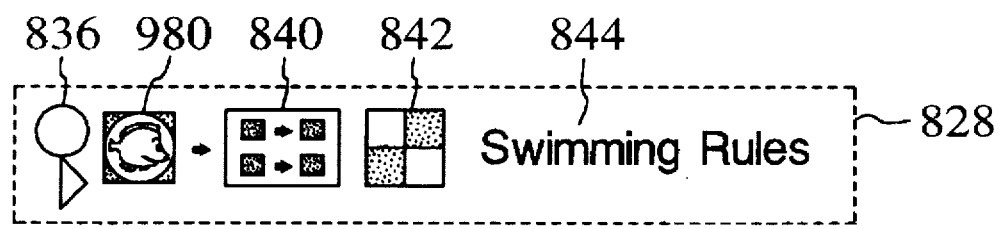
FIG. 16 illustrates a visual subroutine indicator of a subroutine that has a specified pretest.

In the preferred embodiment, visual subroutine indicators visually reflect whether preconditions have been established for their corresponding subroutine. For example, in FIG. 16a, visual subroutine indicator 828 is illustrated with a subroutine precondition indicator 980. In the illustrated example, precondition indicator 980 displays a pretest pattern followed by an arrow, and is located between the tracking light 836 and the subroutine symbol 840.

SUBROUTINE CREATION AND MANIPULATION

Using visual object manipulation techniques, users can easily create, modify, copy, move and delete subroutines. In the preferred embodiment, subroutines are created by selecting the subroutine creation icon 824 in rule creation control region 816 of the object viewer window 800.

Figure 17:
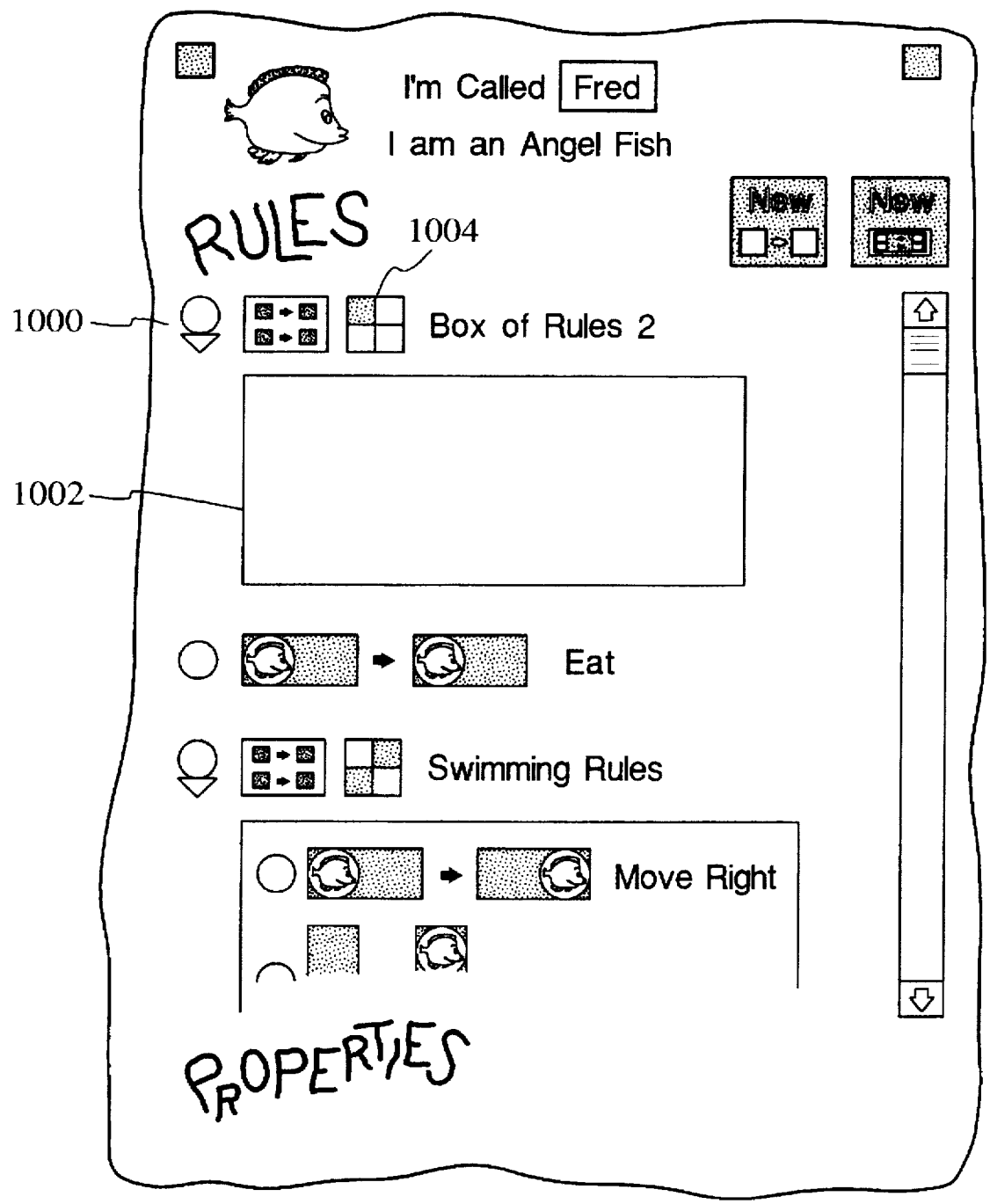
FIG. 17 illustrates an object role viewer window with a new subroutine.

FIG. 17 illustrates a new visual subroutine indicator 1000 that is displayed in the GRR set region 818 in response to selection of the subroutine creation icon 824. The new visual subroutine indicator 1000 is displayed in the open state, causing an empty subroutine display region to be displayed below the visual subroutine indicator 1000. When the new visual subroutine indicator 1000 and its associated subroutine display region 1002 are displayed, anything already listed in the GRR set region 818 is pushed down to provide the necessary room. By default, the new subroutine is assumed to be a normal subroutine. Consequently, the visual subroutine indicator 1000 includes a subroutine type indicator 1004 that indicates a normal subroutine.

Subroutines may be deleted by dragging the visual representation of the subroutine to the remove icon 97, or into a window associated with the remove icon 97, or by dragging the remove icon 97 to the visual representation of the subroutine. In the preferred embodiment, subroutine representations may be dragged by performing two steps. In the first step, a user presses a mouse button while the cursor is over any portion of the subroutine's visual subroutine indicator other than the subroutine type indicator. Alternatively, if the subroutine is in an open state, the user may press the mouse button when the cursor is over an empty part of the subroutine's associated subroutine display region. In the second step, the user holds down the mouse button while moving the cursor. The entire subroutine representation follows the mouse motion. These subroutine creation, dragging and deletion processes are analogous to those described above with reference to GRRs.

Subroutines may be moved and copied between GRR sets by the dragging procedure described above. Subroutines may be placed anywhere that rules are placed. For example, subroutines may be moved from one location in the GRR set of one creature to a different location in the same GRR set, to a different creature's GRR set, into another subroutine, and into the GRR set of a creature in a different class.

Figure 18:
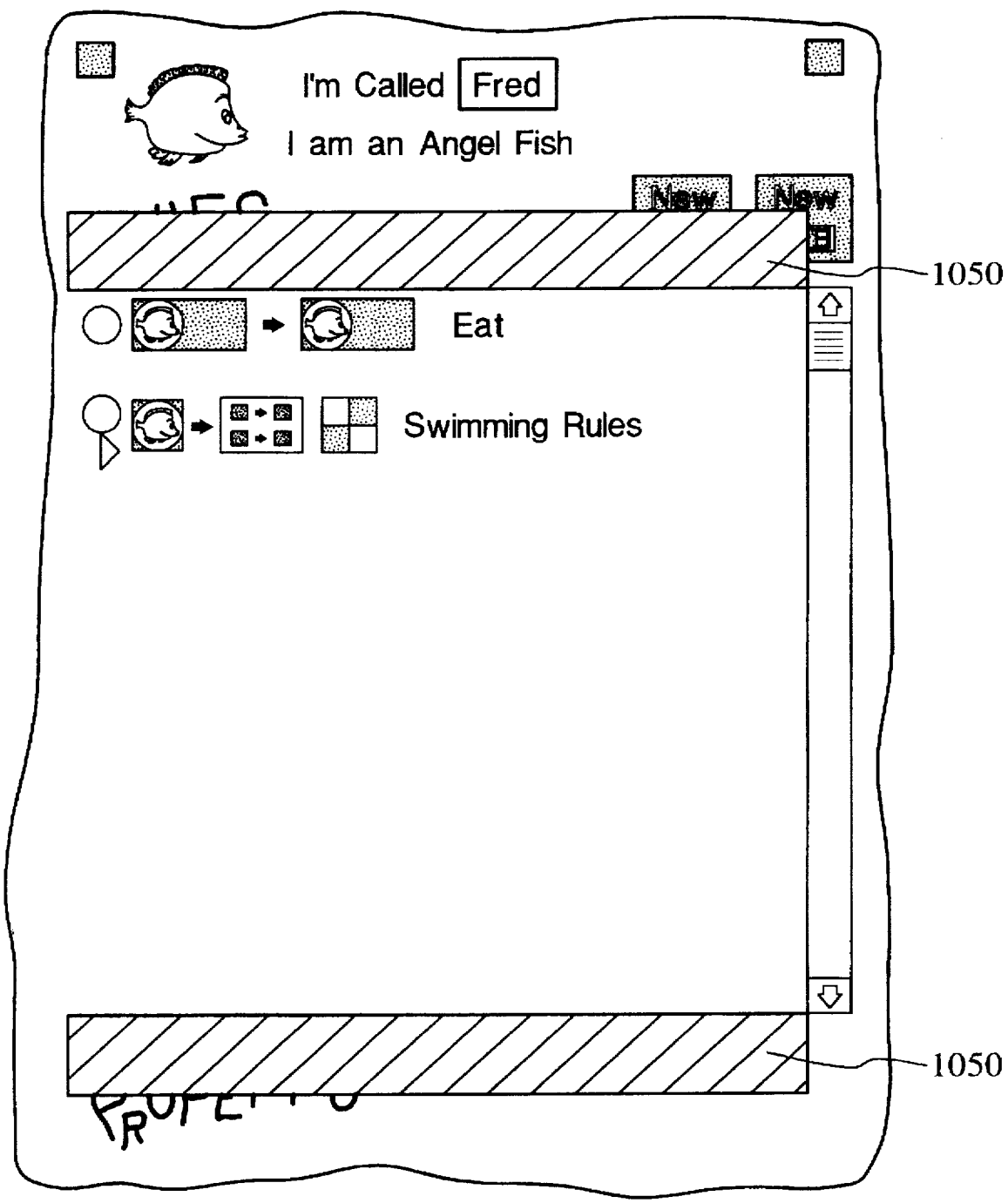
FIG. 18 illustrates auto-scroll regions that border a GRR set region of an object rule viewer window.

Referring to FIG. 18, GRR set regions preferably include relatively small invisible auto-scroll areas 1050 that control automatic scrolling. These auto-scroll areas 1050 facilitate moving rules and subroutines within a GRR set. Specifically, when a rule or subroutine is dragged out of its containing GRR set into an auto scroll area, the GRR set begins scrolling away from the visual indicator that is being dragged. That is, if a subroutine representation is dragged into the lower auto-scroll area, then the GRR set scrolls upward. If the subroutine representation is dragged into the upper auto-scroll area, the GRR set scrolls downward. When the dragged subroutine passes out of the auto-scroll areas, the GRR set region ceases to scroll.

The same drag and drop procedure is used for both moving and copying a subroutine. In the preferred embodiment, whether a subroutine is moved or copied is determined by the destination to which it is dragged. In the preferred embodiment, a rule is moved if it is dragged within the class that owns it, and is copied if it is dragged to a different class.

Figure 19:
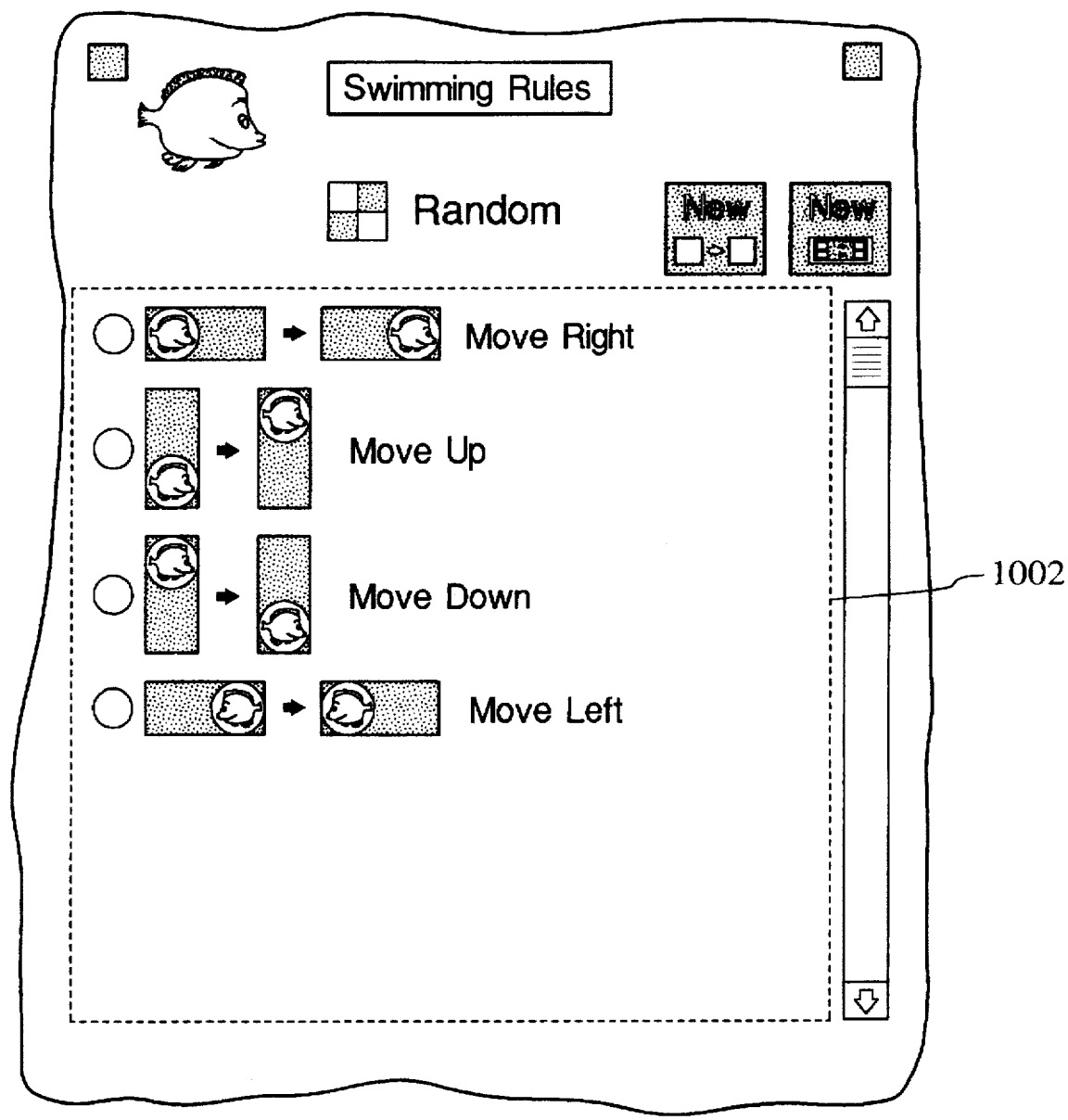
FIG. 19 illustrates a pop-up subroutine display window.

As has already been described above, a subroutine may be opened by selecting the open/close control in the subroutine's visual subroutine indicator. Alternatively, a subroutine may be opened by double-clicking on the subroutine's visual subroutine indicator. However, rather than opening a subroutine display region within a simulation object's GRR set region, double-clicking a subroutine's visual subroutine indicator causes a separate subroutine window to appear. A subroutine window for the "swimming rules" subroutine is illustrated in FIG. 19.

Once a subroutine has been created, the user may establish rules for the subroutine by (1) creating new visual rule indicators within subroutine display region 1002, (2) copying visual role indicators into subroutine display region 1002, and/or (3) moving visual rule indicators into subroutine display region 1002. The rules that correspond to the visual rule indicators that are created or placed within subroutine display region 1002 are automatically associated with the newly created subroutine.

Figure 20:
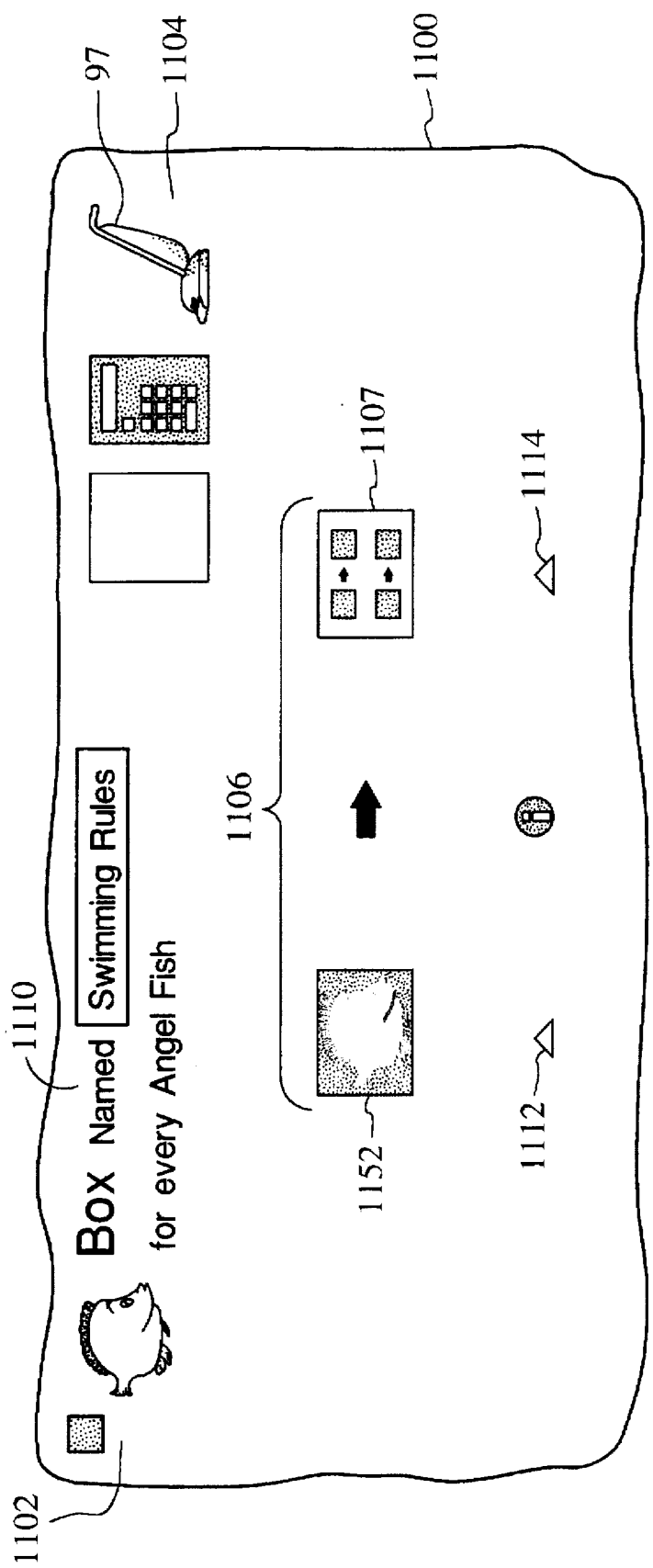
FIG. 20 illustrates a rule editor window for a subroutine.

As mentioned above, users may establish preconditions for subroutines. Preconditions may be established for a subroutine using a GRR editor window 1100 (FIG. 20) that functions similar to GRR editor window 70 described above. A GRR editor window that is editing a subroutine differs from a GRR editor window that is editing a role in that the rule's "after" image is replaced by a subroutine symbol, and the rule's list of actions is replaced by the subroutine's list of GRRs, as shall be explained below.

The GRR editor window 1100 is displayed when a user clicks once on the visual indicator of the subroutine. GRR editor window 1100 includes simulation object identification indicators 1102, editing tool icons 1104, a subroutine pretest indicator 1106, a pretest open/close control 1112 and a GRR set open/close control 1114.

Simulation object identification indicators 1102 identify the object associated with the subroutine. Editing tool icons 1104 represent tools that may be invoked by the user to perform specific functions. Editing tool icons 1104 include, for example, the remove icon 97 used for deleting rules and subroutines.

Subroutine pretest indicator 1106 includes an arrow that points from a pretest image 1152 to a subroutine symbol 1107. The subroutine symbol 1107 is used to indicate that the current contents in the GRR editor window 1100 correspond to a subroutine.

Figure 21:
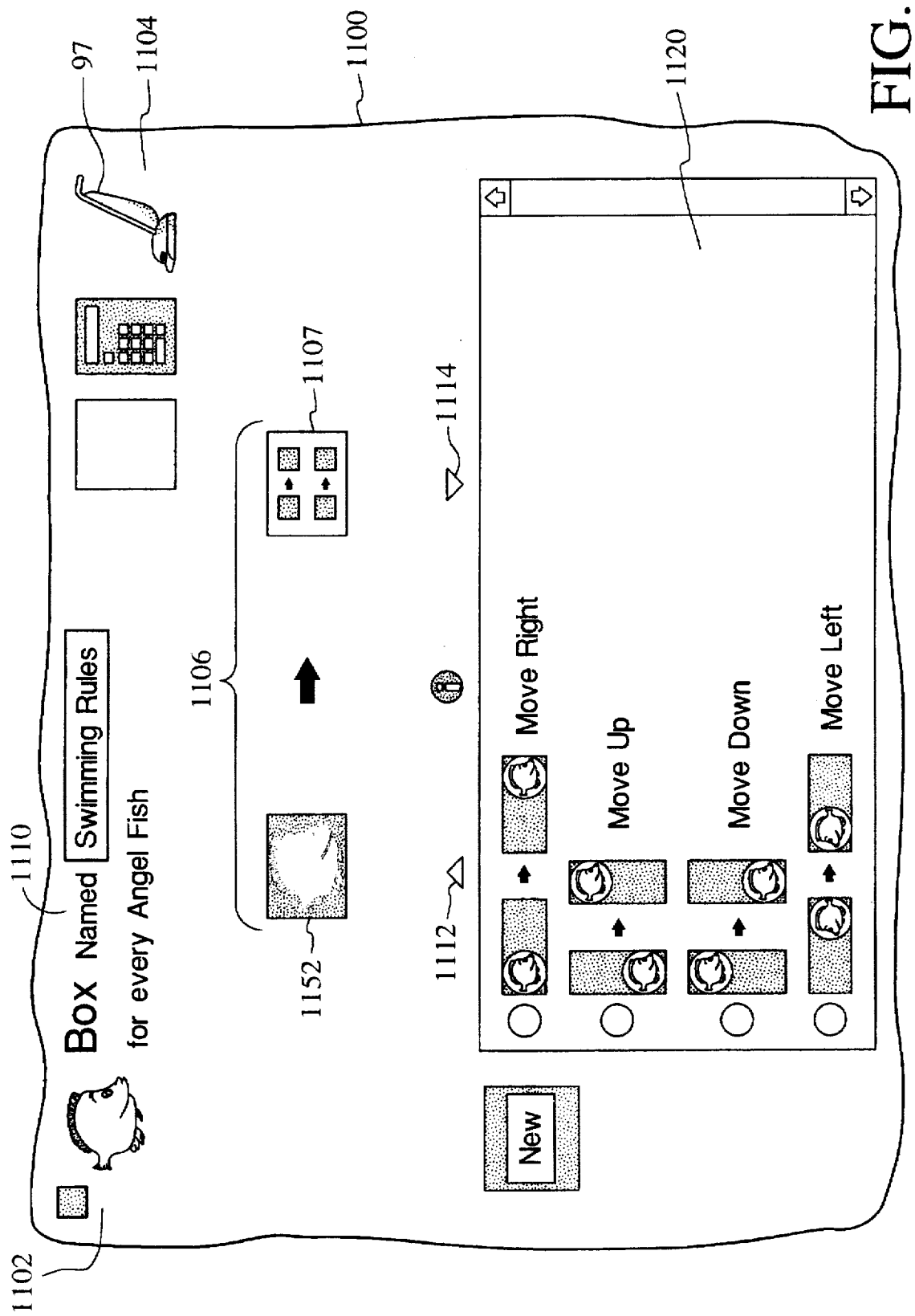
FIG. 21 illustrates the rule editor window of FIG. 20 with an open subroutine GRR set region.

The pretest open/close control 1112 and the GRR set open/close control 1114 may be operated by the user to display additional information about the subroutine. Specifically, by clicking on GRR set open/close control 1114, a user may display a list of the rules associated with the subroutine. FIG. 21 illustrates rule edit window 1100 after a user has operated GRR set open/close control 1114. In response to the operation of GRR set open/close control 1114, a GRR set region 1120 is displayed. A user may edit the rules and the rule sequence by manipulating the rule representations displayed in GRR set region 1120.

Figure 22:
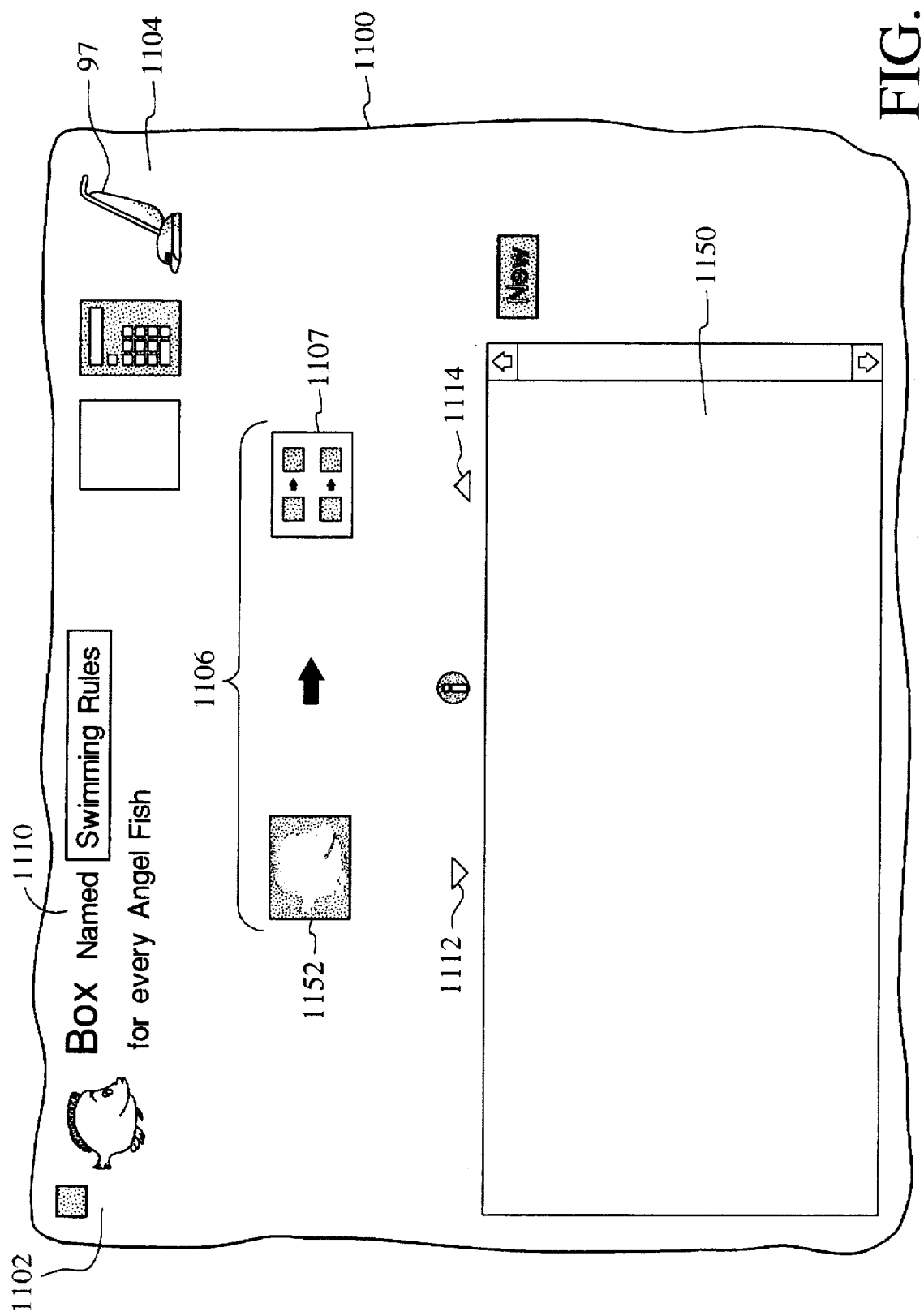
FIG. 22 illustrates the rule editor window of FIG. 20 with an open pretest specification region.

By clicking on the pretest open/close control 1112, a user may display a pretest specification region 1150 (FIG. 22). Initially the pretest specification region 1150 is empty. An empty pretest specification region signifies a "don't care" state, meaning that no preconditions must be met before testing the rules within the subroutine. Preferably, a pretest icon 1152 of subroutine pretest indicator 1106 is shadowed to indicate the "don't care" state. Pretests or preconditions for subroutines are specified in the same manner as they are for rules, as described above.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for establishing behavior for an object implemented in a computer system, wherein the computer system includes a processor and a display device, wherein said processor executes instructions to generate a visual display on said display device, the method comprising the steps of:

A) displaying a GRR set region associated with said object on said visual display;

B) receiving input to create a subroutine for said object;

C) establishing an ordered list of rules for the subroutine by
  C1) displaying a visual subroutine indicator for said subroutine within said GRR set region;
  C2) receiving input that designates one or more behavior rules for said subroutine; and
  C3) generating a corresponding generalized computer program step sequence for said subroutine based upon said one or more behavior rules for said object;

D) displaying on said visual display a subroutine region corresponding to said subroutine; and E) displaying within said subroutine region a visual rule representation for each of said one or more behavior rules of said selected subroutine.

2. The method of claim 1 further comprising the steps of:
receiving input that selects for opening said subroutine;
wherein said steps of D) displaying on said visual display a subroutine region and E) displaying within said subroutine region are performed in response to receiving said input that selects for opening said subroutine.

3. The method of claim 2 further comprising the steps of:
receiving input that selects for closing said subroutine; and
in response to receiving said input that selects for closing said selected subroutine, ceasing to display on said visual display said subroutine region corresponding to said subroutine.

4. The method of claim 3 wherein said visual subroutine indicator includes a subroutine open mechanism, wherein said step of receiving input that selects for opening and said step of receiving input that selects for closing are performed by detecting user interaction with the subroutine open mechanism within the visual subroutine indicator of said subroutine.

5. The method of claim 1 wherein said step of D) displaying on said visual display a subroutine region corresponding to said subroutine is performed by displaying said subroutine region within said GRR set region.

6. The method of claim 5 wherein said step of displaying said subroutine region within said GRR set region includes displaying said subroutine region adjacent to the visual subroutine indicator of said subroutine.

7. The method of claim 1 further including the steps of
receiving input that designates a type for said subroutine; and
visually displaying a type indicator for said subroutine.

8. The method of claim 7 wherein said step of displaying said type indicator is performed by displaying said type indicator as a component of said visual subroutine indicator of said subroutine.

9. The method of claim 1 further comprising the steps of:
receiving input that designates a type for said subroutine;
wherein said step of generating said corresponding generalized computer program step sequence is performed based upon the type designated for said subroutine.

10. The method of claim 1 wherein said step of C3) generating said corresponding generalized computer program step sequence includes the steps of:
a) generating a set of generalized computer program steps for each behavior rule in said subroutine; and
b) generating generalized computer program steps for
b1) sequentially testing each given behavior rule in said subroutine to determine if preconditions for said given behavior rule are satisfied, wherein said sequential testing is performed until either
(i) all of said behavior rules for said subroutine have been tested or
(ii) the preconditions for a particular behavior rule of said subroutine are satisfied; and
b2) if preconditions for said particular behavior rule are satisfied, then
(i) executing said set of generalized computer program steps that correspond to said particular behavior rule.

11. The method of claim 1 wherein said step of C3) generating said corresponding generalized computer program step sequence includes the steps of:
a) generating a set of generalized computer program steps for each behavior rule in said subroutine; and
b) generating generalized computer program steps for performing the following steps for each given behavior rule in said subroutine
b1) testing said given behavior rule to determine if preconditions for said given behavior rule are satisfied; and
b2) executing said set of generalized computer program steps for said given behavior rule if preconditions for said given behavior rule are satisfied.

12. The method of claim 1 wherein said step of C3) generating said corresponding generalized computer program step sequence includes the steps of:
a) generating a set of generalized computer program steps for each behavior role in said subroutine; and
b) generating generalized computer program steps for
b1) sequentially testing each given behavior rule to determine if preconditions for said given behavior rule are satisfied, wherein said sequential testing is performed until either
(i) all of said behavior rules in the subroutine have been tested or
(ii) the preconditions for a particular behavior rule in the subroutine are satisfied; and
b2) if preconditions for said particular behavior role are satisfied, then
(i) executing said set of generalized computer program steps for said particular behavior rule; and
b3) altering the order of said behavior rules within said subroutine.

13. The method of claim 12 further comprising the steps of:
after performing said step of b3) altering the behavior rules within said subroutine, altering the order of said visual rule representations in said subroutine region to reflect the order of said behavior rules within said subroutine.

14. The method of claim 1 wherein said step of C3) generating said corresponding generalized computer program step sequence includes the steps of:
a) generating a set of generalized computer program steps for each behavior rule in said subroutine; and
b) generating generalized computer program steps for
b1) initially selecting a first behavior rule of said subroutine as a current behavior rule;
b2) testing said current behavior rule to determine if preconditions for said current behavior rule are satisfied; and
b3) if preconditions for said current behavior rule are satisfied, then
(i) executing said set of generalized computer program steps for said current behavior rule and
(ii) establishing a next behavior rule of said subroutine as said current behavior rule.

15. The method of claim 14 further comprising the step of displaying a current behavior rule indicator on said visual display, wherein said current behavior rule indicator visually identifies the visual role representation that corresponds to the current behavior rule.

16. The method of claim 1 further comprising the steps of:
receiving user input for imposing a new order to said behavior rules, wherein said user input specifies moving a selected visual rule representation from a first position within said subroutine region to a second position within said subroutine region;
moving said selected visual rule representation from said first position to said second position responsive to said user input; and modifying said generalized computer program step sequence of said selected subroutine responsive to the new order of said one or more visual rule representations in the subroutine region of said selected subroutine.

17. The method of claim 16 wherein said step of receiving user input for imposing a new order includes receiving input that is generated when a user drags said selected visual rule representation from said first position to said second position.

18. The method of claim 1 wherein said object is a simulation object and said behavior rules include graphical rewrite rules.

19. The method of claim 1 wherein said step of C2) receiving input that designates one or more behavior rules for said subroutine includes receiving input that is generated when said user drags a visual representation corresponding to a selected behavior rule of said one or more behavior rules from a first location on said visual display to a second location on said visual display, wherein said first location is outside of said subroutine region and said second location is inside said subroutine region.

20. The method of claim 1 further comprising the steps of:
receiving input that is generated when a user drags a visual representation corresponding to a selected rule of said one or more rules from a first location on said visual display to a second location on said visual display, wherein said first location is within said subroutine region and said second location is outside of said subroutine region; and
removing from said subroutine a portion of the generalized computer program step sequence that corresponds to said one or more subroutines in response to said input.

21. The method of claim 1 further comprising the step of receiving input designating a precondition for said subroutine, wherein said step of C3) generating said corresponding generalized computer program step sequence includes the steps of:
a) generating a set of generalized computer program steps for each behavior rule in said subroutine; and
b) generating generalized computer program steps for
b1) determining if said precondition for said subroutine is satisfied and
b2) testing said behavior rules of said subroutine if and only if said precondition for said subroutine is satisfied.

22. The method of claim 21 further comprising the step of displaying an indication of said precondition as a component of said visual subroutine indicator.

23. An apparatus for establishing behavior for a simulation object, the apparatus comprising:

a display device;

an input device;

a memory storing said simulation object and a sequence of instructions;

a processor coupled to the display device, the input device and the memory;

wherein the processor is configured to retrieve and execute the sequence of instructions from the memory, wherein execution of the sequence of instructions causes the processor to perform the steps of:
A) displaying a GRR set region associated with said object on said display device;
B) receiving input entered by a user through said input device, wherein the input creates a subroutine for said object;
C) establishing an ordered list of rules for said subroutine by performing the following steps
C1) displaying a visual subroutine indicator within said GRR set region;
C2) receiving input that designates one or more behavior rules for said subroutine;
C3) generating a corresponding generalized computer program step sequence for said subroutine based upon said one or more behavior rules;
C5) storing said corresponding generalized computer program step sequence in said memory;
D) displaying on said display device a subroutine region corresponding to said subroutine; and
E) displaying within said subroutine region a visual rule representation for each of said one or more behavior rules associated with said subroutine.

24. The apparatus of claim 19 wherein said memory stores a plurality of generalized computer program step sequences that correspond to a plurality of other simulation objects, wherein execution of said sequence of instructions further causes the processor to perform the steps of:
displaying an image corresponding to said simulation object on said display device;
displaying a plurality of other images corresponding to said plurality of other simulation objects on said display device;
causing said image corresponding to said simulation object to behave according to said generalized computer program step sequence that corresponds to said one or more subroutines;
causing each of said plurality of other images to behave according to a corresponding generalized computer program step sequence of said plurality of generalized computer program step sequences.

* * * * *

UNITED STATES PATENT AND TRADEMARK OFFICE
CERTIFICATE OF CORRECTION

PATENT NO. : 5,678,013
DATED : October 14, 1997
INVENTOR(S) : Smith et al.

It is certified that error appears in the above-identified patent and that said Letters Patent is hereby corrected as shown below:

In column 5 at line 43 delete "role" and insert --rule--

In column 5 at line 53 delete "role" and insert --rule--

In column 7 at line 54 delete "some" and insert --source--

In column 13 at line 1 delete "fast" and insert --first--

In column 13 at line 63 delete "mature" and insert --creature--

In column 20 at line 34 delete "properly" and insert --property--

In column 25 at line 37 delete "fight" and insert --right--

In column 26 at line 53 insert --detail.-- following "greater"

In column 28 at line 14 delete "role" and insert --rule--

In column 28 at line 16 delete "fast" and insert --first--

UNITED STATES PATENT AND TRADEMARK OFFICE
CERTIFICATE OF CORRECTION

PATENT NO. : 5,678,013
DATED : October 14, 1997
INVENTOR(S) : Smith et al.

It is certified that error appears in the above-identified patent and that said Letters Patent is hereby corrected as shown below:

In column 31 at line 50 delete "role" and insert --rule--

In column 32 at line 39 delete "an" and insert --art--

In column 34 at line 57 delete "role" and insert --rule--

In column 34 at line 24 delete "role" and insert --rule--

Signed and Sealed this

Thirteenth Day of January, 1998

Attest:

BRUCE LEHMAN

Attesting Officer

Commissioner of Patents and Trademarks